United States Patent
Hong et al.

(10) Patent No.: US 12,308,001 B2
(45) Date of Patent: May 20, 2025

(54) ELECTRONIC DEVICE CAPABLE OF EXPANDING DISPLAY REGION AND METHOD FOR CONTROLLING SCREEN THEREOF

(71) Applicant: Samsung Electronics Co., Ltd., Gyeonggi-do (KR)

(72) Inventors: Sungmin Hong, Gyeonggi-do (KR); Wankyu Kim, Gyeonggi-do (KR); Myunghoon Kwak, Gyeonggi-do (KR); Changryong Heo, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 118 days.

(21) Appl. No.: 17/574,805

(22) Filed: Jan. 13, 2022

(65) Prior Publication Data
US 2022/0139357 A1 May 5, 2022

Related U.S. Application Data

(63) Continuation of application No. 17/324,237, filed on May 19, 2021, now Pat. No. 11,244,658.

(30) Foreign Application Priority Data

Nov. 5, 2020 (KR) .......................... 10-2020-0147073

(51) Int. Cl.
*G09G 5/373* (2006.01)
*G06F 1/16* (2006.01)
(Continued)

(52) U.S. Cl.
CPC ........... *G09G 5/373* (2013.01); *G06F 1/1652* (2013.01); *G06F 3/0482* (2013.01); *G06F 3/14* (2013.01);
(Continued)

(58) Field of Classification Search
CPC .......... G09G 5/373; G09G 3/035; G09G 5/14; G09G 2354/00; G06F 1/1652;
(Continued)

(56) References Cited

U.S. PATENT DOCUMENTS

| 8,787,016 B2 | 7/2014 | Rothkopf et al. |
| 9,041,648 B2 | 5/2015 | Lee et al. |

(Continued)

FOREIGN PATENT DOCUMENTS

| CN | 107924216 A | 4/2018 |
| CN | 108735100 A | 11/2018 |

(Continued)

OTHER PUBLICATIONS

Korean Notice of Preliminary Rejection dated Jan. 20, 2021.
(Continued)

*Primary Examiner* — Maurice L. McDowell, Jr.
(74) *Attorney, Agent, or Firm* — Cha & Reiter LLC

(57) ABSTRACT

According to certain embodiments, an electronic device performs: displaying a first screen lay; sensing a change in the size of the viewable portion of a flexible display through at least one sensor; displaying a list comprising at least one selectable item in at least a partial region of the flexible display during the changing of the size of the viewable portion of the flexible display; detecting that the changing of the size of the viewable portion of the flexible display has stopped; and if so, displaying the first screen corresponding to the viewable portion of the flexible display with the changed size; and in response to returning of the size of the viewable portion of the flexible display to an original size without completing the change in the size of the viewable portion of the flexible display, displaying a second screen corresponding to a selectable item on the viewable portion of the flexible display having the original size.

19 Claims, 16 Drawing Sheets

(51) Int. Cl.
*G06F 3/0482* (2013.01)
*G06F 3/14* (2006.01)
*G09G 3/00* (2006.01)
*G09G 5/14* (2006.01)

(52) U.S. Cl.
CPC .............. *G09G 3/035* (2020.08); *G09G 5/14* (2013.01); *G09G 2354/00* (2013.01)

(58) Field of Classification Search
CPC ..................... G06F 3/0482; G06F 3/14; G06F 2203/04803; G06F 1/1624; G06F 1/1677; G06F 3/0483; G06F 3/0485; G06F 3/04883; G06F 9/451; G06F 3/04817; G06F 3/04842; G06F 3/0488; H04M 1/0268
See application file for complete search history.

(56) References Cited

U.S. PATENT DOCUMENTS

| | | | |
|---|---|---|---|
| 9,778,766 B2 | 10/2017 | Choi et al. | |
| 10,203,863 B2 | 2/2019 | Kwon et al. | |
| 10,990,208 B2 | 4/2021 | Jung et al. | |
| 2009/0061947 A1* | 3/2009 | Park | G06F 3/0488 345/173 |
| 2013/0234951 A1* | 9/2013 | Kim | G06F 3/0481 345/173 |
| 2013/0275910 A1 | 10/2013 | Kim et al. | |
| 2014/0340299 A1 | 11/2014 | Lee et al. | |
| 2015/0062027 A1 | 3/2015 | Yang et al. | |
| 2015/0227223 A1 | 8/2015 | Kang et al. | |
| 2016/0349971 A1 | 12/2016 | Chi et al. | |
| 2016/0378270 A1 | 12/2016 | Lee et al. | |
| 2017/0061932 A1* | 3/2017 | Kwon | G06F 1/1626 |
| 2017/0069299 A1 | 3/2017 | Kwak et al. | |
| 2017/0140504 A1 | 5/2017 | Jeong et al. | |
| 2017/0269961 A1 | 9/2017 | Fan et al. | |
| 2017/0308346 A1* | 10/2017 | Lee | G06F 1/1652 |
| 2019/0012008 A1* | 1/2019 | Yoon | G06F 1/1652 |
| 2019/0227703 A1 | 7/2019 | Lee et al. | |
| 2019/0261519 A1 | 8/2019 | Park et al. | |
| 2019/0278336 A1 | 9/2019 | Choi et al. | |
| 2019/0346954 A1 | 11/2019 | Jung et al. | |
| 2020/0064889 A1 | 2/2020 | Liang et al. | |

FOREIGN PATENT DOCUMENTS

| | | |
|---|---|---|
| CN | 109491541 A | 3/2019 |
| CN | 111801646 A | 10/2020 |
| EP | 2 987 051 B1 | 5/2013 |
| JP | 6792004 B2 | 11/2020 |
| KR | 10-2014-0125243 A | 10/2014 |
| KR | 10-2014-0135404 A | 11/2014 |
| KR | 10-2015-0025635 A | 3/2015 |
| KR | 10-2015-0094477 A | 8/2015 |
| KR | 10-1668450 B1 | 10/2016 |
| KR | 10-2016-0139320 A | 12/2016 |
| KR | 10-2017-0024942 A | 3/2017 |
| KR | 10-1736170 B1 | 5/2017 |
| KR | 10-1752750 B1 | 7/2017 |
| KR | 10-1784880 B1 | 10/2017 |
| KR | 10-1919257 B1 | 11/2018 |
| KR | 10-2019-0101184 A | 8/2019 |
| KR | 10-2019-0128843 A | 11/2019 |
| KR | 10-2022-0020017 A | 2/2022 |

OTHER PUBLICATIONS

Korean Notice of Patent Grant dated May 6, 2021.
Korean Office Action dated Dec. 4, 2023.
European Search Report dated Dec. 13, 2023.
Notice of Patent Grant dated Jun. 27, 2024.
Chinese Office Action dated Oct. 30, 2024.

* cited by examiner

ELECTRONIC DEVICE CAPABLE OF EXPANDING DISPLAY REGION AND METHOD FOR CONTROLLING SCREEN THEREOF

CROSS-REFERENCE TO RELATED APPLICATION(S)

This application is a Continuation of U.S. patent application Ser. No. 17/324,237, filed on May 19, 2021 which is based on and claims priority under 35 U.S.C. 119 to Korean Patent Application No. 10-2020-0147073, filed on Nov. 5, 2020, in the Korean Intellectual Property Office, the disclosure of which is herein incorporated by reference in its entirety.

BACKGROUND

1) Field

Certain embodiments relate to an electronic device capable of expanding a size of the viewable portion of the display region, and a method for controlling a screen thereof

2) Description of Related Art

An electronic device (for example, a mobile terminal, a smartphone, or a wearable terminal) may include a flexible display. For example, an electronic device may include a flexible display which can be curved or which is foldable or rollable. As another example, the flexible display may be displayed on the electronic device such that the size of the viewable portion of the display region thereof can be expanded. For example, at least a partial region of the flexible display may positioned inside the housing (for example, rolled and disposed inside the electronic device), and may be exposed to the outside by the user (the viewable portion of the flexible display), thereby expanding the size of the viewable portion of the display region. Such an expansion of the viewable portion of the display region may provide a new user interface environment.

Meanwhile, electronic devices may provide functions (for example, an imaging function, a music playback function, a navigation function, a short-range wireless communication (for example, Bluetooth, Wi-Fi, or near-field communication (NFC)) function, a fingerprint recognition function, and an electronic payment function).

The above information is presented as background information only to assist with an understanding of the disclosure. No determination has been made, and no assertion is made, as to whether any of the above might be applicable as prior art with regard to the disclosure.

SUMMARY

An electronic device according to certain embodiments may include, for example: a flexible display; at least one sensor configured to sense a change in a size of the flexible display; at least one processor operatively connected to the flexible display and the at least one sensor; and a memory operatively connected to the at least one processor, wherein the memory is configured to store instructions that, when being executed, cause the at least one processor to: display a first screen on the flexible display; sense a change in the size of the flexible display through the at least one sensor; display a list including at least one selectable item in at least a partial region of the flexible display while the size of the flexible display changes; determine whether the change in the size of the flexible display is completed; in response to completion of the change in the size of flexible display, display the first screen corresponding to the flexible display having the changed size; and in response to returning of the size of the flexible display to an original size without completion of the change in the size of the flexible display, display a second screen corresponding to an item, which is selected while the size of the flexible display changes, among items included in the list, on the flexible display having the original size.

A method for controlling a screen of an electronic device capable of expanding a display region according to certain embodiments may include, for example: displaying a first screen on a display; sensing a change in the size of the display through at least one sensor; displaying a list including at least one selectable item in at least a partial region of the display while the size of the display changes; determining whether the change in the size of the display is completed; in response to completion of the change in the size of the display, displaying the first screen corresponding to the display having the changed size; and in response to returning of the size of the display to an original size without completion of the change in the size of the display, displaying a second screen corresponding to an item, which is selected while the size of the display changes, among items included in the list, on the display having the original size.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The disclosures presents embodiments where the user of an electronic device with flexible display can change screens by partially expanding the size of the viewable portion of the flexible display and then fully reducing the size to a minimum or partially reducing the size, and then fully expanding the size to a maximum.

The user of an electronic device may execute multiple applications. Even if multiple applications are executed, only a screen from one application is displayed on the display of the electronic device. The user of the electronic device may have to use another application through screen switching. This can be inconvenient.

Although, the user of the electronic device may use multiple applications through a multi-screen display. This too requires the user to take multiple inconvenient steps.

At the same time, it is noted that in electronic devices with flexible displays, it is unusual for a user to only partially expand the viewable portion of the display or reduce the viewable portion of the display. Thus a pattern of partial expansion followed by complete reduction, or partial reduction followed by complete expansion can be used as a gesture for switching screens. It is noted however that a full expansion or full reduction can be common. Accordingly, in certain embodiments, when the flexible display is fully expanded or fully reduced, the same screen appears.

Certain embodiments may provide an electronic device capable of expanding a display region thereof and a method for controlling a screen thereof, wherein screen control can be easily performed by using an operation (for example, a sliding operation) of expanding or reducing the display region.

In certain embodiments, the user can expand/reduce the size of the viewable portion of the display as a gesture for switching screens.

FIGS. 1 through 11, discussed below, and the certain embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

Figure 1:
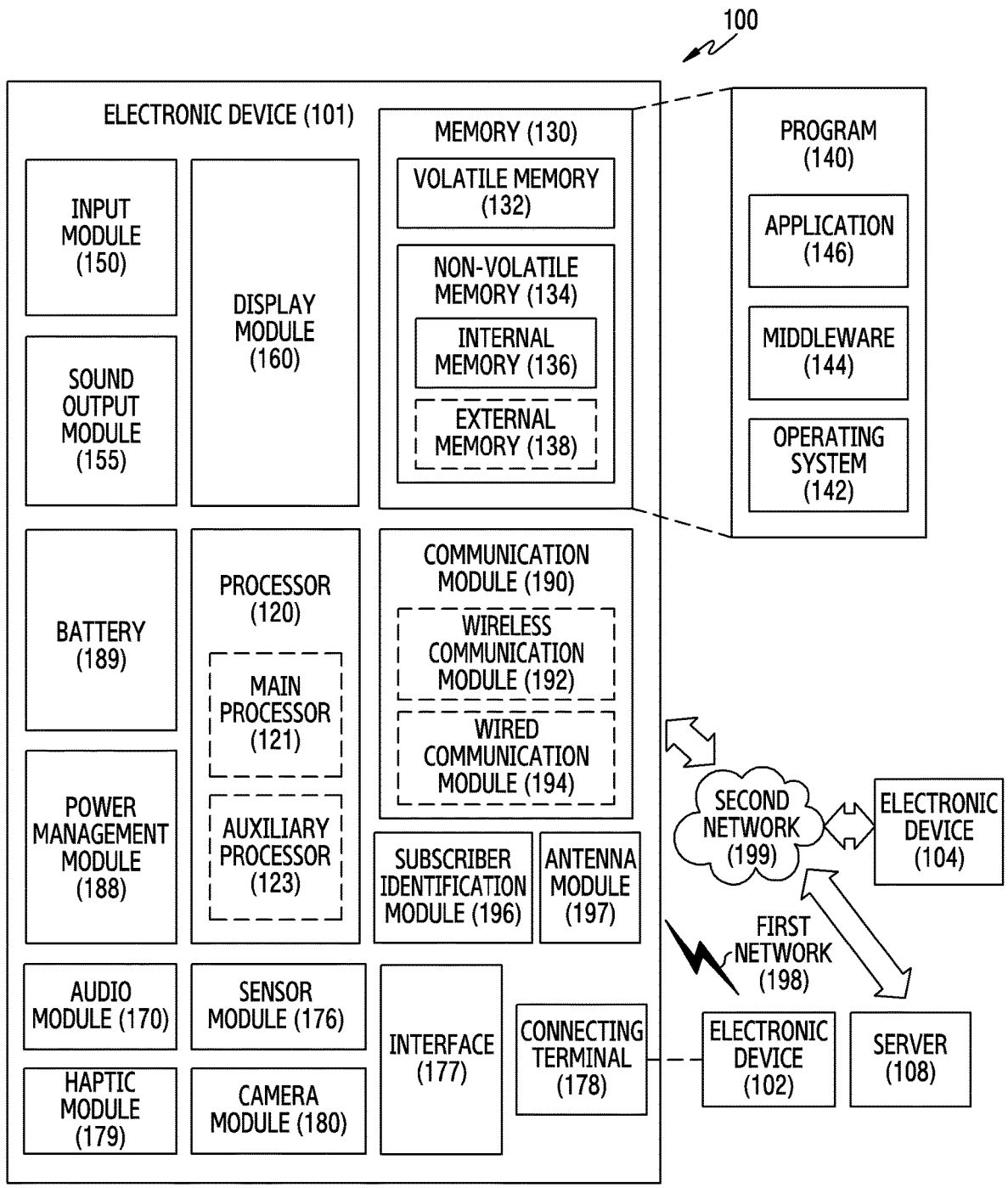
FIG. 1 illustrates a block diagram of an electronic device in a network environment according to certain embodiments.

FIG. 1 describes an electronic device 101 according to certain embodiments of the disclosure. The electronic device 101 includes a display module 160, which may include an expandable display. In a case where the user uses multiple applications at the same time, the electronic device 101 can display a screen from another one of the multiple applications when the viewable portion of the display is expanded.
Electronic Device FIG. 1 illustrates a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The term "processor" shall refer to both the singular and plural contexts in this document.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch. The display module 160 can include a flexible display, which will be described in more detail in, among other places, FIG. 2A, 2B, 2C.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly.

According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The display module 160 can include a flexible display. A flexible display provides a large display area for a more better user experience, while maintaining the portability of the electronic device 100. Electronic device 100 are advantageously small to allow users to easily carry them on their person. However, this also imposes size restrictions on the display module 160. A flexible display allows the user to enjoy a larger display when using the device, while allowing reduced dimensions through folding or deforming, when the user is carrying the electronic device 100.

Figure 2A:
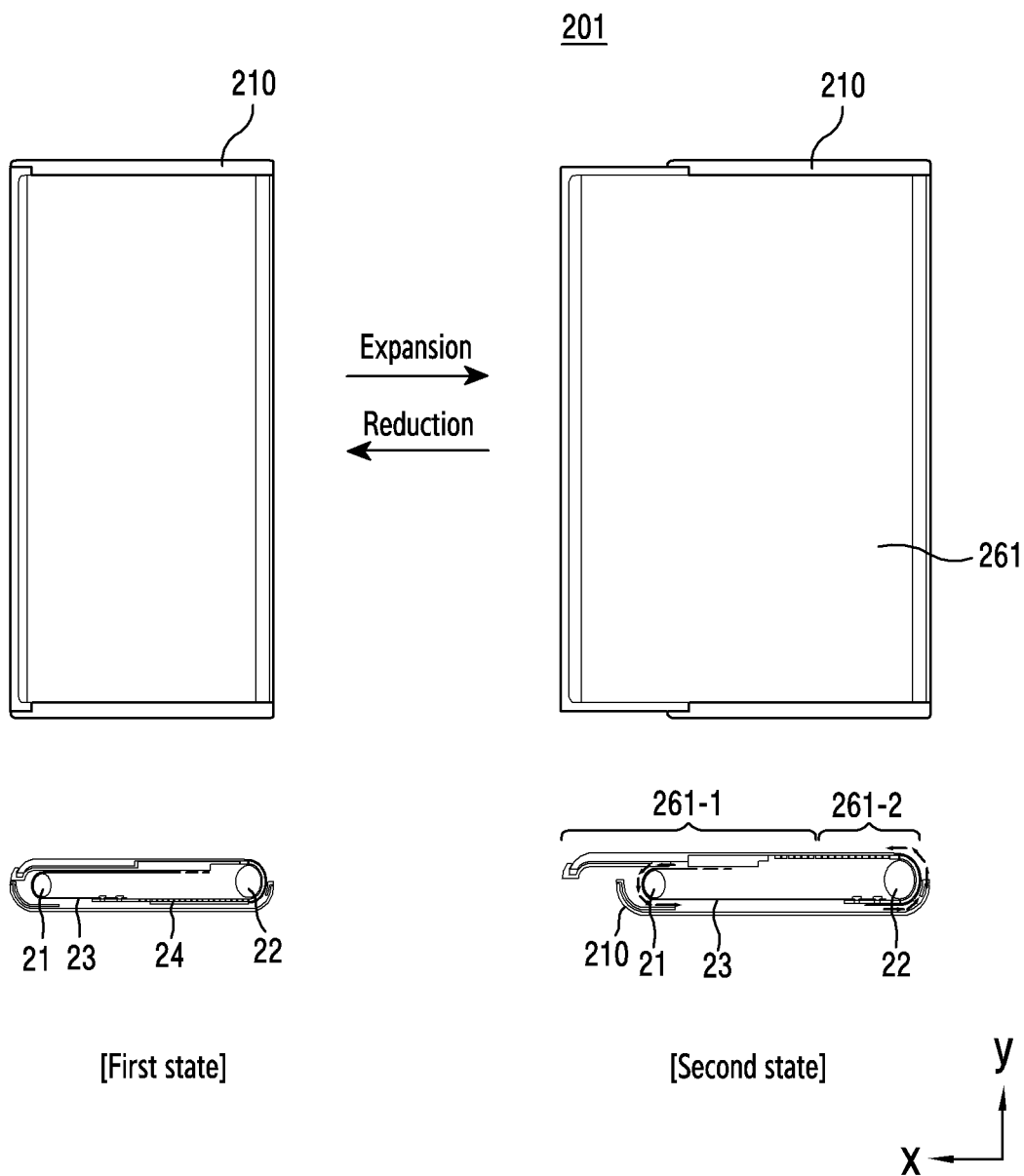
FIG. 2A illustrates a slidable electronic device according to certain embodiments.
Figure 2B:
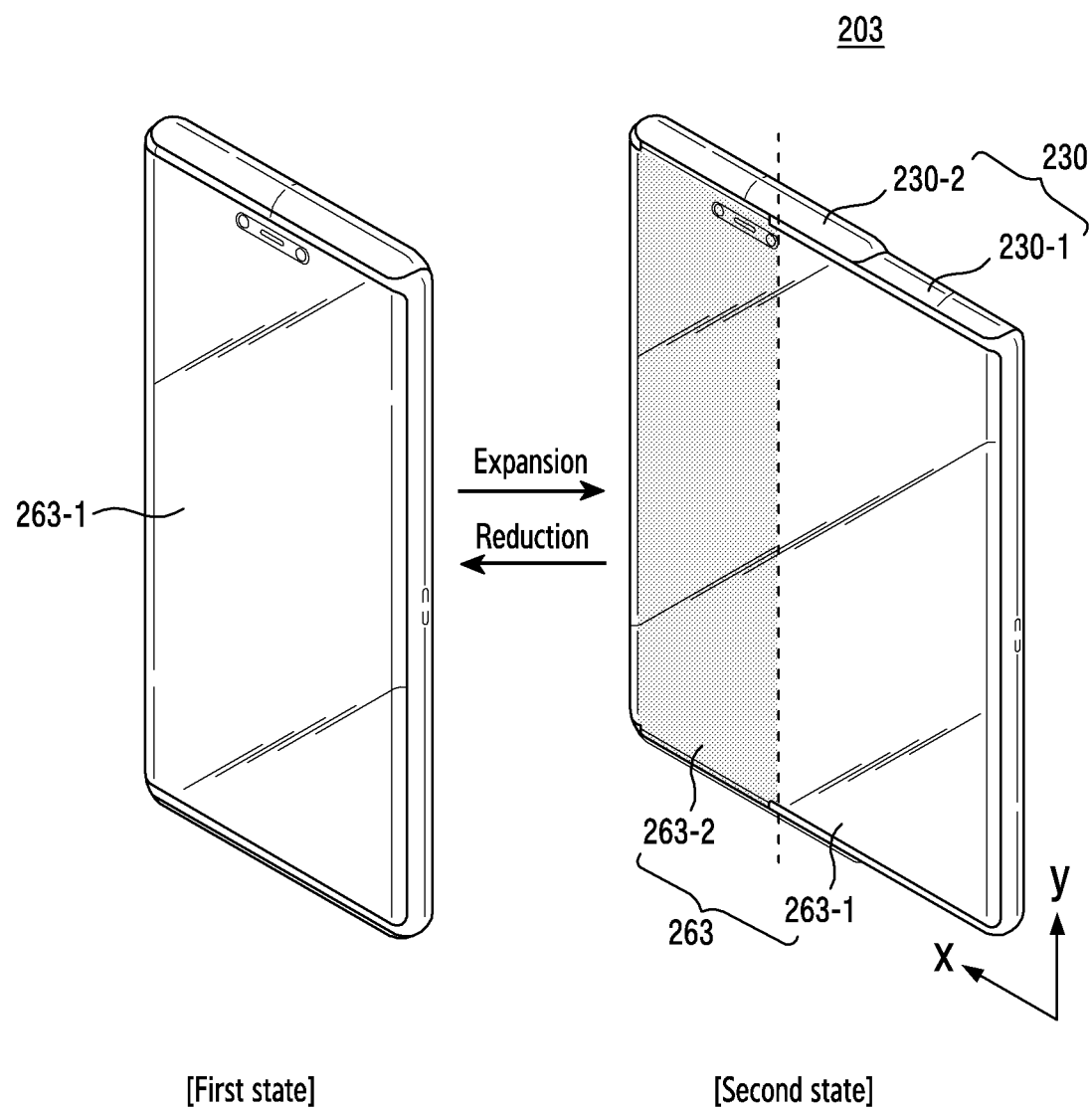
FIG. 2B illustrates a slidable electronic device according to certain embodiments.
Figure 2C:
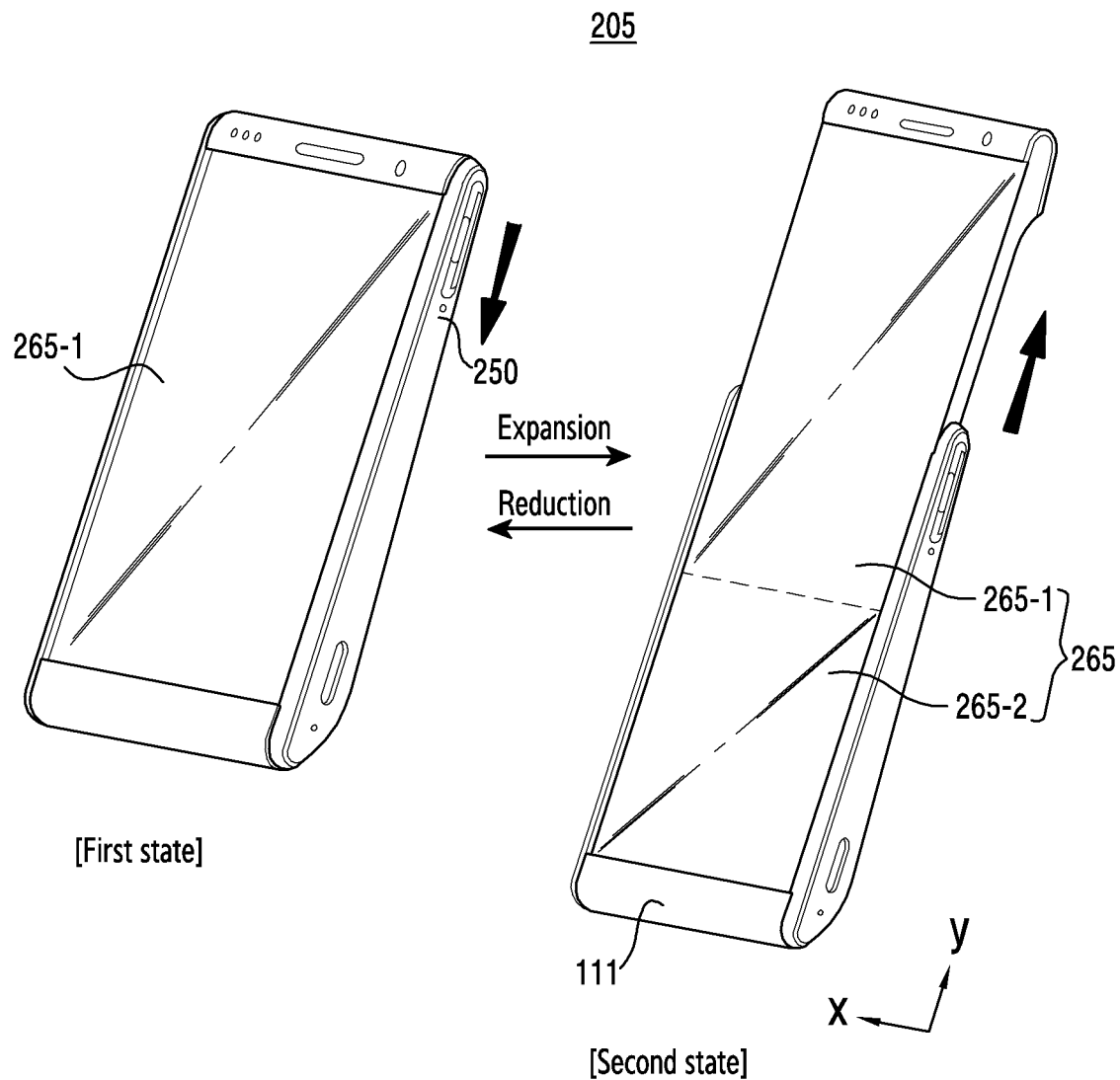
FIG. 2C illustrates a slidable electronic device according to certain embodiments.

FIGS. 2A, 2B, and 2C describe a slidable electronic device with a flexible display.

Electronic Device with Flexible Display

FIG. 2A illustrates a electronic device according to certain embodiments, FIG. 2B illustrates a electronic device according to certain embodiments, and FIG. 2C illustrates a electronic device according to certain embodiments.

Referring to FIGS. 2A to 2C, electronic devices (e.g., the electronic device 101) 201, 203, and 205 according to certain embodiments may include flexible displays 261, 263, and 265, respectively. According to an embodiment, the flexible displays 261, 263, and 265 may be arranged at the electronic devices 201, 203, and 205, respectively, so as to be expandable in at least one direction (e.g., a transverse and/or longitudinal direction), thereby increasing the size of the viewable portion of the flexible display. The "viewable portion of the flexible display" shall be understood to mean, in an flexible display, that portion of the flexible display that is viewable by the user. Portion shall include some part of or all of.

According to an embodiment, as illustrated in FIG. 2A, in the electronic device (hereinafter, referred to as "first electronic device") 201, the first flexible display 261 may be expanded or reduced in the transverse direction (e.g., the X-axis direction), thereby increasing the width of the view portion of the flexible display. For example, a first region 261-1, which is one part of the first flexible display 261, may be always visually exposed to (viewable from) the outside. A second region 261-2, which is another part of the first flexible display 261, may be positioned in a housing 210 in a first state (a slide-in state in which the second region 261-2 is drawn in the housing 210), and may become visually exposed to the outside in a second state (e.g., a slide-out state or unrolled state in which the second region 261-2 is drawn out of the housing 210).

In the slide-in state, the viewable portion of the flexible display is 261-1. In the slide-out state, the viewable portion of the flexible display is contiguous area of 261-1 and 261-2. As can be seen, the viewable portion of the flexible display is expanded when going from the slide-in state to the slide-out state.

According to certain embodiments, the first flexible display 261 may slide in or slide out in a manual, semiautomatic, or automatic manner. For example, as illustrated in FIG. 2A, the first electronic device 201 may include the first flexible display 261, a first roller 21, a second roller 22, a tension belt 23, and a support 24, which cause the first flexible display 261 to slide in or slide out in a manual manner. The first roller 21 and the second roller 22 may be arranged to be opposite to each other, and may rotate. The tension belt 23 may be connected at one end thereof to one end of the support 24 and connected at the other end thereof to the other end of the support 24 to provide a tension force to pull both ends of the support 24, thereby providing force to maintain the evenness of the support 24. The support 24 is disposed while being in contact with the second region 261-2 of the first flexible display 261, and may evenly support the second region 261-2 when the second region 261-2 is visually exposed to the outside.

According to another example, the first electronic device 201 may further include an elastic body (not shown) which causes the first flexible display 261 to slide in or slide out in a semiautomatic manner. According to another example, in order to cause the first flexible display 261 to slide in or slide out in an automatic manner, the first electronic device 201 may further include a gear (not shown) and a motor (not shown), which are configured to rotate at least one of the first roller 21 or the second roller 22. FIG. 2A is only one example, and thus the first electronic device 201 may cause the first flexible display 261 to slide in or slide out in a manual, semiautomatic, or automatic manner by using various known structures.

According to another embodiment, as illustrated in FIG. 2B, in the electronic device (hereinafter, referred to as "second electronic device") 203, a part of a housing 230 may be expanded or reduced in the transverse direction (X-axis direction). For example, the housing 230 may include a first body 230-1 and a second body 230-2, and the first body 230-1 may be coupled to the second body 230-2 such that the same can be drawn into the second body 230-2 (can be reduced) or can be drawn out of the second body 230-2 (can be expanded). A first region 263-1 of a second flexible display 263 may be positioned on a first surface (e.g., the front surface) of the first body 230-1 and may be always visually exposed to the outside. A second region 263-2 may be positioned in the second body 230-2, in a first state, and thus may not be visually exposed to the outside, and, in a second state, may be visually exposed to the outside through a first surface (e.g., the front surface) of the second body 230-2. The second electronic device 203 is similar to the first electronic device 201, except that a part (e.g., the first body 230-1) of the housing 230 is expanded or reduced in order to expand or reduce the second flexible display 263, and thus a detailed description thereof will be omitted.

In the first state, the viewable portion of the flexible display is 263-1. In the second state, the viewable portion of the flexible display is contiguous area of 263-1 and 263-2. As can be seen, the viewable portion of the flexible display is expanded when going from the slide-in state to the slide-out state.

According to another embodiment, as illustrated in FIG. 2C, in the electronic device (hereinafter, referred to as "third electronic device") 205, a third flexible display 265 may be expanded or reduced in the longitudinal direction (e.g., Y-axis direction). Similarly to the first electronic device 201 and the second electronic device 203, in the third electronic device 205, a first region 265-1 of the third flexible display 265 may be always visually exposed to the outside, and a second region 265-2 of the third flexible display 265 may not be visually exposed to the outside in a first state but may be visually exposed to the outside in a second state. The third electronic device 205 is similar to the first electronic device 201 and the second electronic device 203, except that the third flexible display 265 is expanded or reduced in the longitudinal direction, and thus a detailed description thereof will be omitted.

According to certain embodiments, the electronic devices 201, 203, and 205 may perform screen control based on an interaction which changes the states of the flexible displays 261, 263, and 265 (e.g., changes the size of the flexible displays (e.g., expands or reduce the flexibles displays)). For example, the electronic devices 201, 203, and 205 may perform screen switching through an interaction which changes (e.g., expands or reduces) the sizes of the flexible displays 261, 263, and 265 while a first screen is displayed, and then returns the sizes of the flexible displays to an original state, and may execute a multiscreen through an interaction which inputs a designated event (e.g., holding for a predetermined time or longer, or a designated gesture input) while changing the sizes of the flexible displays 261, 263, and 265. A detailed description thereof will be made later with reference to FIGS. 3 to 11.

In the first state, the viewable portion of the flexible display is 265-1. In the second state, the viewable portion of the flexible display is contiguous area of 265-1 and 265-2. As can be seen, the viewable portion of the flexible display is expanded when going from the slide-in state to the slide-out state.

In electronic devices with non-flexible displays or displays which do not expand, the output of an executed application is called a screen which typically consumes the entire or substantially the entire displayable area of the flexible display. However, when a user is using two application simultaneously, the user can to switch screens. Additionally, some screens, such as a pay application can output multiple screens, only one of which is shown at one time. The user typically has to swipe sideways. This is inconvenient.

In certain embodiments, of the disclosure, expanding/reducing the size of the viewable portion of the display as a gesture for switching screens.

Figure 3:
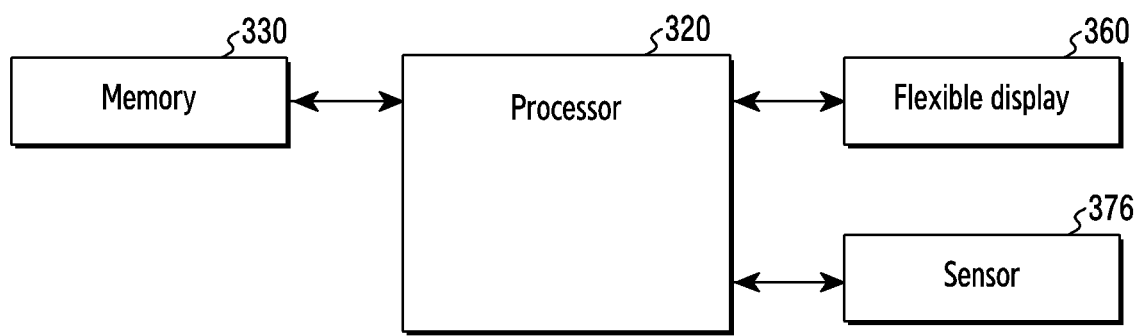
FIG. 3 illustrates a block diagram of an electronic device according to an embodiment.

FIG. 3 illustrates a block diagram of an electronic device according to an embodiment. The sensor 376 can sense whether the viewable portion of the flexible display 360 is being increased or reduced and provide signals to the processor 320. Based on the signals received by the processor 320 from the sensor, the processor 320 can determine which screen among multiple applications being executed to display.

Referring to FIG. 3, an electronic device 301 (e.g., the electronic device 101 in FIG. 1 or the first to third electronic devices 201, 203, and 205 in FIGS. 2A to 2C) according to an embodiment may include a processor 320 (e.g., the processor 120 in FIG. 1), a memory 330 (e.g., the memory 130 in FIG. 1), a flexible display 360 (e.g., the display module 160 in FIG. 1 or the first to third flexible displays 261, 263, and 265 in FIGS. 2A to 2C), and a sensor module 376 (e.g., the sensor module 176 in FIG. 1).

The processor 320 may control a screen on the basis of at least one interaction which changes the state of the flexible display 360 (e.g., changes the size of the flexible display 360 (e.g., expands or reduces the flexible display 360)). For example, the processor 320 may switch a screen or execute a multiscreen on the basis of an interaction. A detailed description thereof will be made later with reference to FIGS. 4 to 11.

According to certain embodiments, the memory 330 may be operatively connected to the processor 320. The memory 330 may store instructions that, when executed, cause the processor 320 to perform a plurality of operations comprising controlling a screen on the basis of at least one interaction which changes the state of the flexible display 360 (e.g., changes the size of the flexible display 360 (e.g., expands or reduces the flexible display 360)). According to an embodiment, the memory 330 may store history information (an execution time or the frequency of execution) of an executed application. According to an embodiment, the memory 330 may store history information (an execution time, the frequency of execution) of an application executed within a predetermined period of time (e.g., seven days).

According to certain embodiments, the flexible display 360 may be curved, foldable, or rollable. According to an embodiment, the flexible display 360 may be disposed such that a display region can expand. For example, at least a part of the region of the flexible display 360 may be positioned in the housing so as not to be visually exposed to the outside, and may be drawn out of the housing for the expansion of a display region.

According to certain embodiments, the sensor module 376 may sense a state change (e.g., sliding-in (or rolling) or sliding-out (or unrolling)) of the flexible display 360 and may transfer the sensing result to the processor 320. According to an embodiment, the sensor module 376 may sense the state change by using at least one among multiple hall ICs, a touch sensor (e.g., TSP), a magnetic sensor, a proximity sensor, an optical sensor, a time-of-flight (ToF) sensor, a motion sensor, or a rotary position sensor. For example, the electronic device 301 may have multiple hall ICs disposed at regular intervals on a path on which the flexible display 360 slides, and may recognize sliding-in or sliding-out on the basis of the order of signals received from the respective hall ICs. In another example, the electronic device 301 may have a touch sensor disposed on a path on which the flexible display 360 slides, and may recognize sliding-in or sliding-out on the basis of a touch signal sensed according to a sliding operation. In another example, the electronic device 301 may have at least one magnetic sensor disposed on a path on which the flexible display 360 slides, and may recognize sliding-in or sliding-out on the basis of a change of the intensity of a magnetic signal depending on a sliding operation. In another example, the electronic device 301 may cause a partial region of the flexible display 360 to emit light in a particular pattern (or a brightness pattern), and may use an optical sensor (or illumination sensor) to recognize the corresponding pattern, thereby recognizing sliding-in or sliding-out. In another example, the electronic device 301 may have a ToF sensor, which includes a light emitter and a light receiver, disposed in a partial region of the flexible display 360, may recognize a distance through a time it takes for infrared rays emitted from the light emitter to be reflected and returned to the light emitter, and may recognize sliding-in or sliding-out on the basis of a change (e.g., increase or decrease) in the distance. In another example, the electronic device 301 may have a motion sensor mounted to the first roller 21 or the second roller 22, and may recognize a sliding direction (e.g., sliding-in or sliding-out) on the basis of the rotation direction and/or rotation amount of the first roller 21 or the second roller 22, sensed through the motion sensor. In another example, the electronic device 301 may sense the rotation direction and/or rotation amount of the first roller 21 or the second roller 22 through the rotary position sensor, and may recognize sliding-in or sliding-out on the basis of the sensed rotation direction and/or rotation amount.

Figure 4:
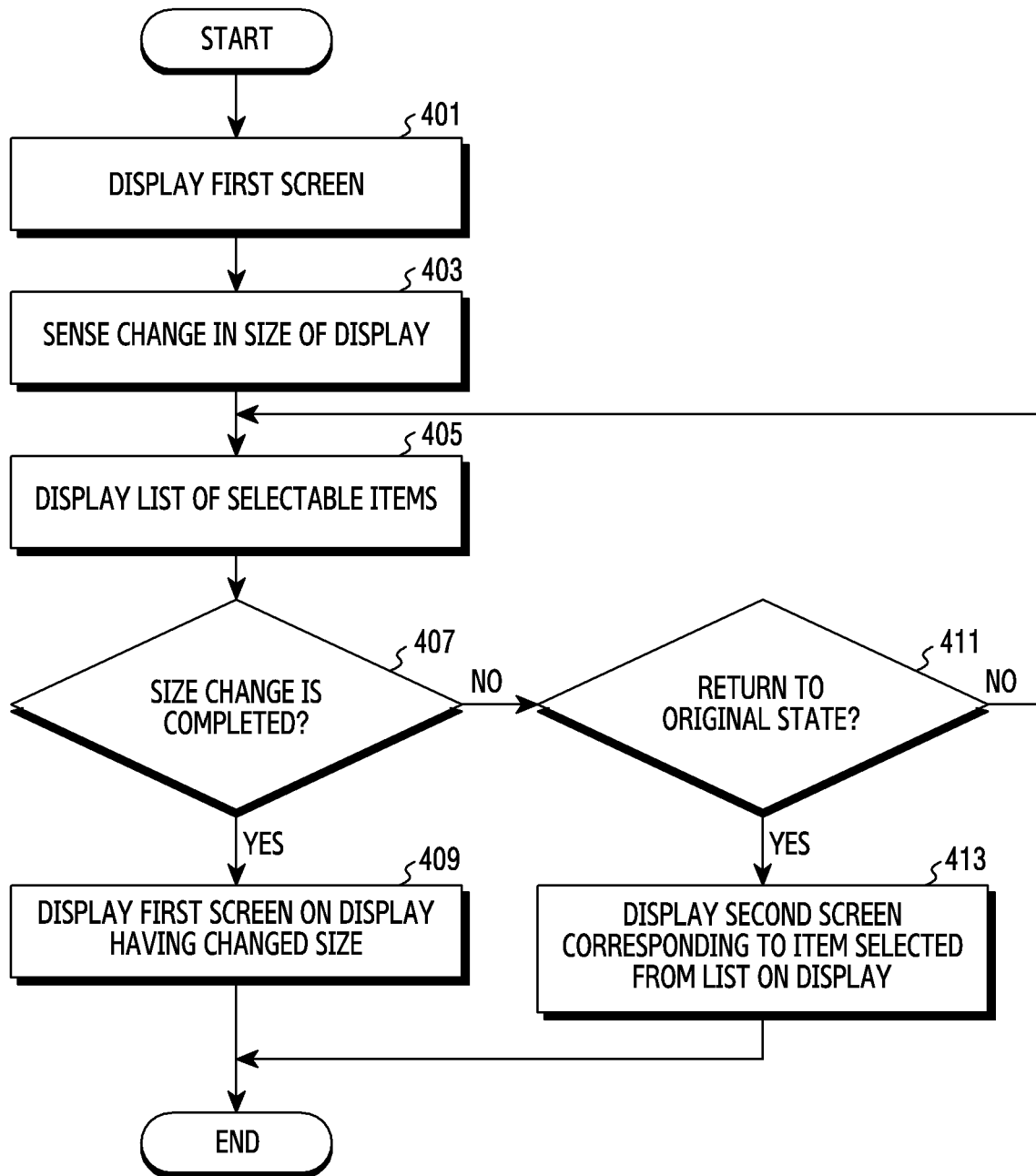
FIG. 4 illustrates a flowchart illustrating a method for controlling a screen of an electronic device according to an embodiment.

FIG. 4 illustrates a flowchart illustrating a method for controlling a screen of an electronic device according to an embodiment Referring to FIG. 4, in operation 401, a processor (e.g., the processor 120 in FIG. 1 or the processor 320 in FIG. 3) of an electronic device (e.g., the electronic device 101 in FIG. 1, the first to third electronic devices 201, 203, and 205 in FIGS. 2A to 2C, or the electronic device 301 in FIG. 3) according to an embodiment may display a first screen on a flexible display (e.g., the display module 160 in FIG. 1, the first to third flexible displays 261, 263, and 265 in FIGS. 2A to 2C, or the flexible display 360 in FIG. 3). Herein, the flexible display may be in a state in which the same has the smallest size (hereinafter, referred to "reduced state") (see FIGS. 5A, 5C, and 6), or may be in a state in which the same has the largest size (hereinafter, referred to as "expanded state") (see FIG. 5B).

According to certain embodiments, in operation 403, the processor may sense a change of the size of the flexible display. For example, through at least one sensor (e.g., the sensor module 176 in FIG. 1 or the sensor module 376 in FIG. 3), the processor may sense that the flexible display is expanded in the transverse direction in the reduced state (see FIGS. 5A and 6), or may sense that the flexible display is reduced in the transverse direction in the expanded state (see FIG. 5B). According to an embodiment, through at least one sensor, the processor may sense that the flexible display is expanded in the longitudinal direction in the reduced state (e.g., see FIG. 5C), or may sense that the flexible display is reduced in the longitudinal direction in the expanded state. Sensing a change of the size of the flexible display may imply sensing a change of the size of the viewable portion of the flexible display. For example, the change of the size of the flexible display may imply a change of the size of the viewable portion of the flexible display. In another example, sensing a change of the size of the flexible display may imply sensing a change of the size of the viewable portion of the flexible display, which is visually exposed through the front surface of the electronic device.

According to certain embodiments, in operation 405, the processor may display a list including at least one selectable item. For example, the processor may display the list including the at least one selectable item in at least a partial region of the flexible display while the size of the flexible display is changed. In certain embodiments, the list can be displayed sequentially while in other embodiments, the list can be displayed in selectable menu format simultaneously. For example, the processor may display the list in the entire region of the flexible display, the size of which is being changed (e.g., see FIGS. 5A to 5C), or may display the list in an increased display region (e.g., see FIG. 6). The at least one selectable item included in the list may include an item corresponding to an object included in a recently executed application or the first screen (a currently executed application).

According to an embodiment, the list may include items, the number (e.g., 6) of which is designated based on a priority (e.g., recent use or the frequency of use). The processor may display one of items included in the list as a representative item (e.g., may display the same in the largest size, may display the same at the center, and/or may highlight the same). The processor may scroll the list in response to a change of the size of the flexible display to change the representative item. According to an embodiment, when a change of the size of the flexible display is sensed, the processor may display one item based on a priority, and may sequentially change the displayed item in response to the change of the size of the flexible display.

According to certain embodiments, in operation 407, the processor may determine whether the change of the size of the flexible display is completed. For example, through at least one sensor, the processor may determine whether the flexible display has been completely expanded from a reduced state or may determine whether the flexible display has been completely reduced from an expanded state.

As a result of the determination in operation 407, when the change of the size of the flexible display is completed, the processor may display, in operation 409, the first screen on the flexible display which has a changed size (e.g., which is in an expanded state or a reduced state). In contrast, as a result of the determination in operation 407, when the change of the size of the flexible display is not completed, the processor may determine, in operation 411, whether the flexible display returns to the original state.

As a result of the determination in operation 411, when the flexible display does not return to the original state, the processor may return to operation 405. The processor may display the list until the change of the size of the flexible display is completed or the flexible display returns to the original state. For example, the processor may scroll the list in response to the change of the size of the flexible display to change the representative item. As a result of the determination in operation 411, when the flexible display returns to the original state, the processor may display, in operation 413, a second screen corresponding to an item selected from the list on the flexible display which is in the original state (e.g., a reduced state or an expanded state).

According to an embodiment, the processor may determine that a representative item, displayed at the time point of a change of a direction in which the size of the flexible display (the display region of the flexible display) changes (or in a direction in which the flexible display slides), is the selected item. For example, the processor may determine that a representative item, finally displayed at the time of a change from sliding-out to sliding-in, is the selected item. Similarly, the processor may determine that a representative item, finally displayed at the time of a change from sliding-in to sliding-out, is the selected item. When a direction in which the size of the flexible display changes is changed, the processor may not scroll the list in response to the change of the size of the flexible display.

According to another embodiment, the processor may determine the selected item on the basis of a change in the sliding speed of the flexible display. For example, when a sliding operation (e.g., sliding-in or sliding out) is performed within a designated first speed, the processor may scroll the list according to the sliding operation, and, when it is sensed that the sliding speed changes to a second speed, may determine that a representative item displayed at the time at which the change (e.g., increase) of the sliding speed has been sensed is the selected item.

Further, according to another embodiment, the processor may determine that an item, for which user input (e.g., touch) is received, among items included in the list, is the selected item.

Figure 5A:
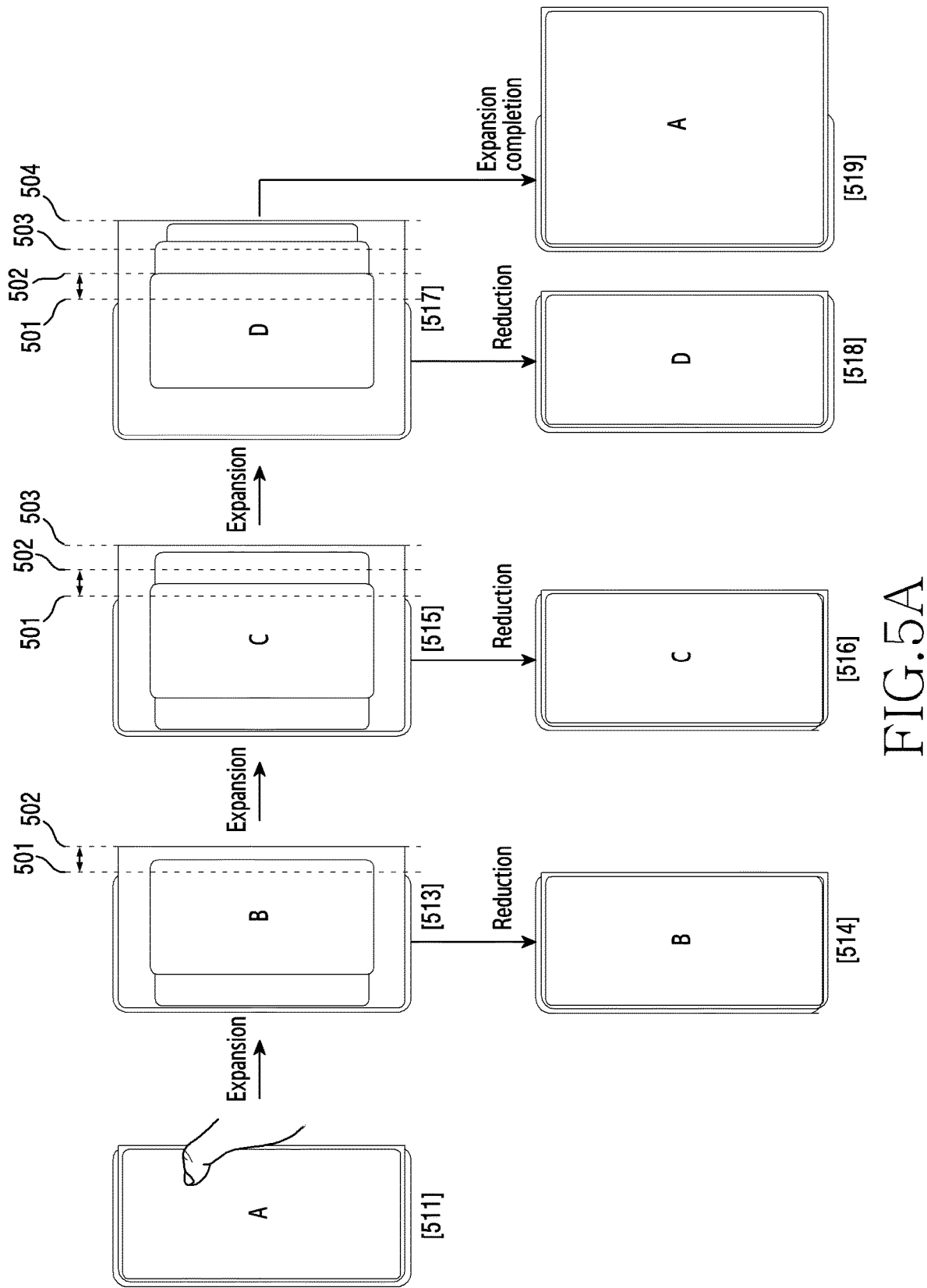
FIG. 5A illustrates an example of controlling a screen of an electronic device according to an embodiment.

FIG. 5A illustrates an example of controlling a screen of an electronic device according to an embodiment. The user can select a screen of another application to display by increasing the size of the viewable portion of the flexible display to one of a plurality of reference points, and then reducing the size of the viewable portion of the flexible display to the minimum size (or within 10% deviation, now collectively referred to as "minimum"). For example, depending on whether user expands the size of the viewable portion of the display to reference 502, 503, 504 and then reduces to the minimum size, the electronic device will display a screen from application B, C, or D on the flexible display. If the user expands the size of the viewable portion of the display to the maximum size (or within 10% deviation, now collectively referred to as "maximum"), the electronic device reverts to the screen for application A.

Referring to FIG. 5A, an electronic device (e.g., the electronic device 101 in FIG. 1, the first to third electronic devices 201, 203, and 205 in FIGS. 2A to 2C, or the electronic device 301 in FIG. 3) according to an embodiment may display, as in a drawing corresponding to reference sign 511, a first screen on a flexible display (e.g., the display module 160 in FIG. 1, the first to third flexible displays 261, 263, and 265 in FIGS. 2A to 2C, or the flexible display 360 in FIG. 3) in a first state (a normal state in which the flexible display has the smallest size). The first screen may be an execution screen of application "A".

According to an embodiment, the electronic device may sense the expansion (e.g., sliding-out) of the flexible display. When the expansion of the flexible display is sensed, the electronic device may display a list including at least one item (e.g., a thumbnail image). For example, as in a drawing corresponding to reference sign 513, when the flexible display is expanded beyond a first reference limit 501, the electronic device may display, based on a priority (e.g., recent execution or the frequency of execution), a list including cascading images of previously executed applications on the expanded flexible display. As in a drawing corresponding to reference sign 513, the electronic device may display, in a largest size, an image corresponding to application "B" which has been most recently executed (or most frequently executed) (hereinafter, referred to as "representative image").

In a state as in the drawing corresponding to reference sign 513, when the flexible display slides in and returns to the first state, the electronic device may display, as in a drawing corresponding to reference sign 514, an execution screen of application "B" on the flexible display which is in the first state. Thus, a user of the electronic device may easily switch the execution screen of application "A" to the execution screen of application "B" through slide-in and slide-out operations. In contrast, in the state as in the drawing corresponding to reference sign 513, when the flexible display is expanded beyond a second reference limit 502, the electronic device may scroll the list as in a drawing corresponding to reference sign 515. For example, the electronic device may display, as a representative image, an image corresponding to application "C" having a next priority.

In a state as in the drawing corresponding to reference sign 515, when the flexible display returns to the first state, the electronic device may display, as in a drawing corresponding to reference sign 516, an execution screen of application "C" on the flexible display which is in the first state. Thus, the user of the electronic device may easily switch the execution screen of application "A" to the execution screen of application "C" through slide-out and slide-in operations. In contrast, in the state as in the drawing corresponding to reference sign 515, when the flexible display is expanded beyond a third reference limit 503, the electronic device may scroll the list, as in a drawing corresponding to reference sign 517. For example, the electronic device may display, as a representative image, an image corresponding to application "D" having a next priority.

In a state as in the drawing corresponding to reference sign 517, when the flexible display slides in and returns to the first state, the electronic device may display, as in a drawing corresponding to reference sign 518, an execution screen of application "D" on the flexible display which is in the first state. Thus, the user of the electronic device may easily switch the execution screen of application "A" to the execution screen of application "D" through slide-out and slide-in operations. In contrast, in the state as in the drawing corresponding to reference sign 517, when the flexible display is completely expanded beyond a fourth reference limit 504, the electronic device may determine that there is no intention to switch a screen, as in a drawing corresponding to reference sign 519, and may display the execution screen of application "A" on the flexible display which has been completely expanded.

According to an embodiment, the number of items included in the list may have a designated value (e.g., 6). The items included in the list may be determined based on a priority. The number of reference limits may be set based on the number of items included in the list. For example, if the list includes six items, the number of reference limits may be set to 7 (=6 (the number of items)+1). The first reference limit may have a designated value (e.g., 0.5 cm). The last reference limit (e.g., a seventh reference limit) may have a value (e.g., 6.5 cm) obtained by subtracting a designated value (e.g. 0.5 cm) from the maximum expandable length of the flexible display (e.g., 7 cm). The remaining reference limits between the first reference limit and the last reference limit may be set to have an interval (e.g., 1 cm) obtained by dividing the distance between the first reference limit and the last reference limit (6 cm=6.5 cm−0.5 cm) by the number of items (e.g., 6). For example, the first reference limit may be set to 0.5 cm, the second reference limit may be set to 1.5 cm, the third reference limit may be set to 2.5 cm, the fourth reference limit may be set to 3.5 cm, the fifth reference limit may be set to 4.5 cm, the sixth reference limit may be set to 5.5 cm, and the seventh reference limit may be set to 6.5 cm. If the list includes only items, the number of which is smaller than the designated number (e.g., as illustrated in FIG. 5A, three items (images corresponding to applications "B, C, and D")), the electronic device may display an image of application "D" from the time the third reference limit (2.5 cm) is exceeded until the seventh reference limit is exceeded. According to an embodiment, the electronic device may display the image of application "B" when the fourth reference limit is exceeded, may display the image of the application "C" when the fifth reference limit is exceeded, and may display the image of application "D" when the sixth reference limit is exceeded. In certain embodiments, the image of the application can be a thumbnail.

In certain embodiments, the electronic device displays a new screen when the reduction in size to the minimum from the reference size occurs within a predetermined period of time (e.g., 2 seconds) from the cessation of increasing. In certain embodiments, an increase followed by a temporary partial reduction or cessation (e.g., less than 10% of the increase for a period of less than 2 seconds) followed by another increase is deemed one increase, and the reduction or cessation is disregarded.

According to an embodiment, the number of or intervals between reference limits may be changed based on the number of items included in the list. For example, if the number of items included in the list is 3, the interval between the first reference limit and the last reference limit may be set to 2 cm (=6 cm/3). The first reference limit may be set to 0.5 cm, the second reference limit may be set to 2.5 cm, the third reference limit may be set to 4.5 cm, and the fourth reference limit may be set to 6.5 cm.

Figure 5B:
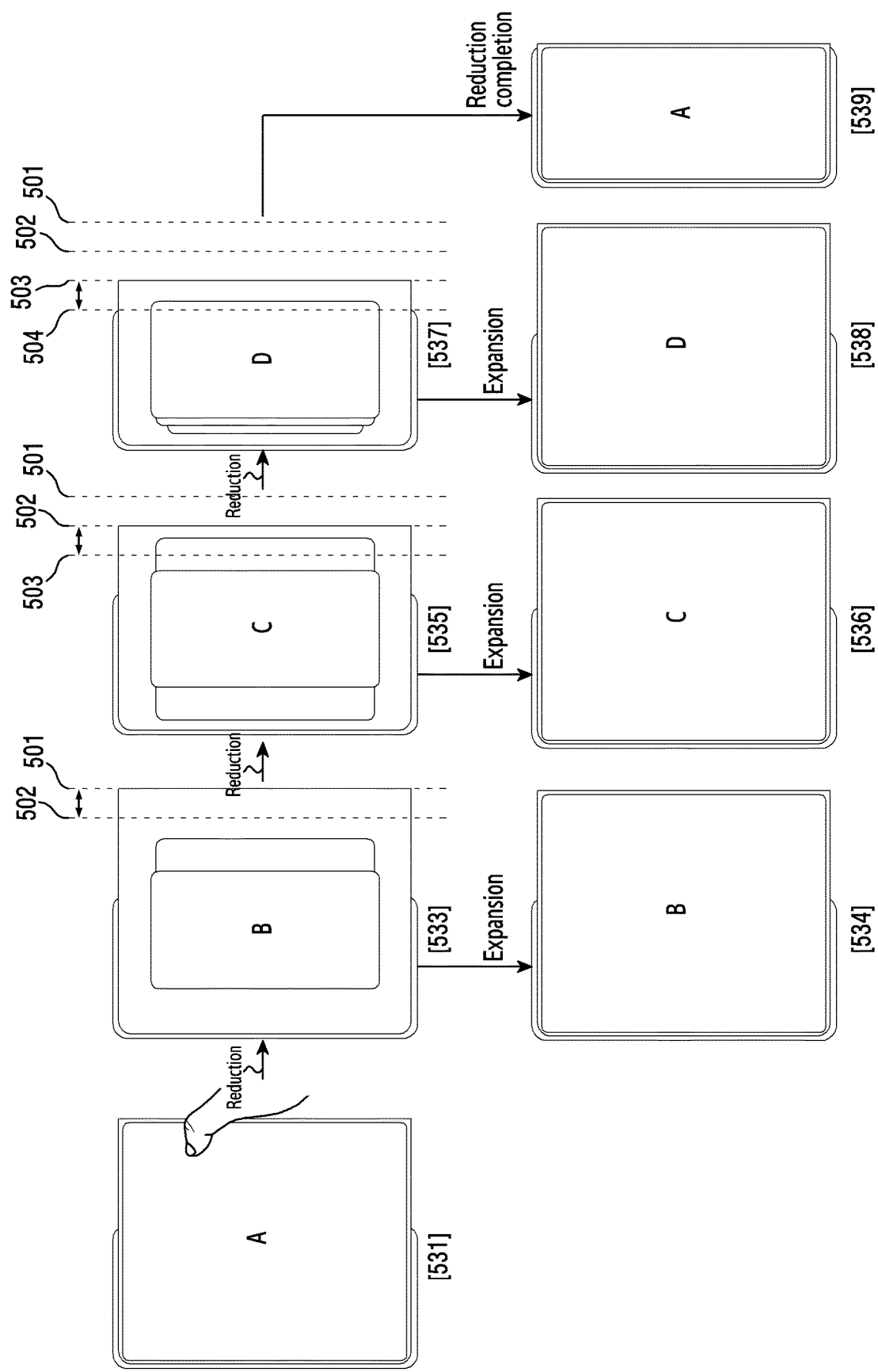
FIG. 5B illustrates an example of controlling a screen of an electronic device according to an embodiment.

FIG. 5B illustrates an example of controlling a screen of an electronic device according to an embodiment. In FIG. 5B, the user can select a screen for display by reducing the size of the viewable portion of the flexible display to a particular reference size, and then expanding it back to the maximum size. For example, depending on whether user reduces the size of the viewable portion of the display to reference 502, 503, 504 and then expands to the maximum size, the electronic device will display a screen from application B, C, or D on the flexible display. If the user reduces the size of the viewable portion of the display to the minimum size, the electronic device reverts to the screen for application A.

Referring to FIG. 5B, an electronic device (e.g., the electronic device 101 in FIG. 1, the first to third electronic devices 201, 203, and 205 in FIGS. 2A to 2C, or the electronic device 301 in FIG. 3) according to an embodiment may display, as in a drawing corresponding to reference sign 531, a first screen on a flexible display (e.g., the display module 160 in FIG. 1, the first to third flexible displays 261, 263, and 265 in FIGS. 2A to 2C, or the flexible display 360 in FIG. 3) which is in a second state (an expansion completion state in which the flexible display has the largest size). The first screen may be an execution screen of application "A".

According to an embodiment, the electronic device may sense reduction (e.g., sliding-in) of the flexible display. As illustrated in drawings corresponding to reference signs 533, 535, and 537, the electronic device may scroll a list including at least one item (e.g., a thumbnail image) in response to the reduction of the flexible display.

In a state as in the drawing corresponding to reference sign 533, 535, or 537, when the flexible display slides out and returns to the second state, the electronic device may display, as in a drawing corresponding to reference sign 534, 536, or 538, an execution screen of application "B", an execution screen of application "C", or an execution screen of application "D" on the flexible display which is in the second state.

In the state as in the drawing corresponding to reference sign 537, when the reduction of the flexible display is completed, as in a drawing corresponding to reference sign 539, the electronic device may determine that there is no intention to switch a screen and may display the execution screen of application "A" on the flexible display which has been completely reduced.

FIG. 5B is similar to FIG. 5A except that a sliding operation is used for application switching in the second state (expanded state) of the flexible display, and thus a detailed description thereof will be omitted.

Figure 5C:
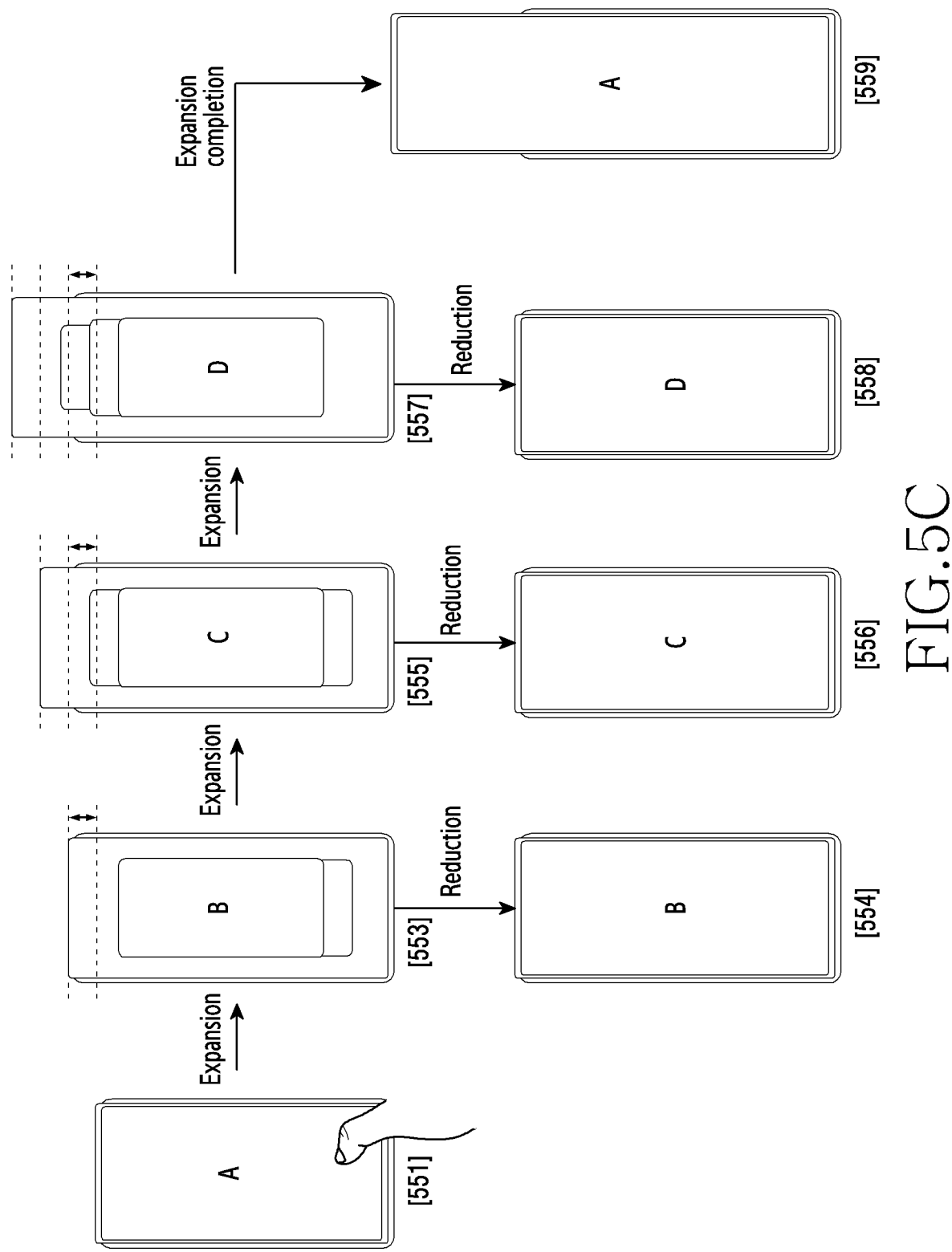
FIG. 5C illustrates an example of controlling a screen of an electronic device according to an embodiment.

FIG. 5C illustrates an example of controlling a screen of an electronic device according to an embodiment.

Referring to FIG. 5C, in an electronic device (e.g., the electronic device 101 in FIG. 1, the first to third electronic devices 201, 203, and 205 in FIGS. 2A to 2C, or the electronic device 301 in FIG. 3) according to an embodiment, a flexible display may be expanded or reduced in the longitudinal direction.

According to certain embodiments, the electronic device in FIG. 5C may perform screen switching through an interaction in which the flexible display expands in the longitudinal direction and then returns to the original state. For example, as in a drawing corresponding to reference sign 551, the electronic device may display the first screen. In a state in which the first screen is displayed, the electronic device may scroll a list in response to the longitudinal expansion of the flexible display as illustrated in a drawing corresponding to reference sign 553, 555, or 557. When the flexible display returns from the state as in the drawing corresponding to reference sign 553, 555, or 557 to the original state, the electronic device may perform, as in a drawing corresponding to reference sign 554, 556, or 558, screen switching to a second screen (an execution of application "B", an execution of application "C", or an execution of application "D"). In contrast, when the flexible display has been completely expanded in the longitudinal direction without returning to the original state, the electronic device may display the first screen on the expanded flexible display, as in a drawing corresponding to reference sign 559. The electronic device in FIG. 5C is similar to the electronic device in FIG. 5A except that the flexible display slides out (is expanded) or slides in (is reduced) in the longitudinal direction, and thus a detailed description thereof will be omitted.

FIG. 5C illustrates an example in which application switching is performed through a sliding operation in which the flexible display slides out (is expanded) in the longitudinal direction and then slides in (is reduced). However, similarly to FIG. 5B, in the electronic device in FIG. 5C, application switching may be performed through a sliding operation in which the flexible display slides in the longitudinal direction and then slides out, in a state in which the flexible display is completely expanded.

Figure 6:
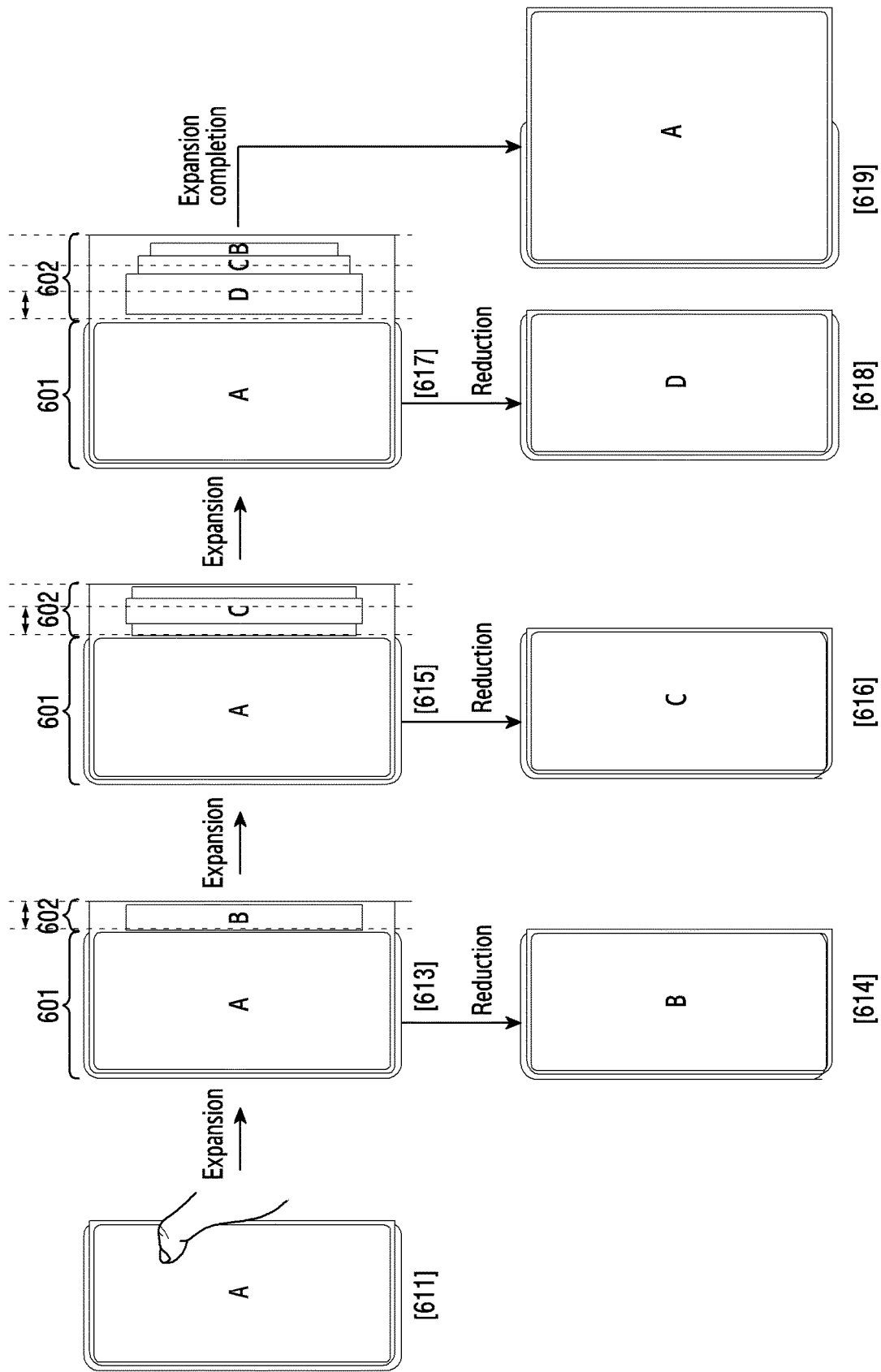
FIG. 6 illustrates an example of controlling a screen of an electronic device according to an embodiment.

FIG. 6 illustrates an example of controlling a screen of an electronic device according to an embodiment. In certain embodiments, the during expansion of the size of the viewable portion of the display, the originally displayed screen can continue to be displayed in the original area and an indicator of a different screen(s) can be displayed in the expansion area.

Referring to FIG. 6, an electronic device (e.g., the electronic device 101 in FIG. 1, the first to third electronic devices 201, 203, and 205 in FIGS. 2A to 2C, or the electronic device 301 in FIG. 3) according to an embodiment may display, as in a drawing corresponding to reference sign 611, a first screen on a flexible display (e.g., the display module 160 in FIG. 1, the first to third flexible displays 261, 263, and 265 in FIGS. 2A to 2C, or the flexible display 360 in FIG. 3) which is in a first state (a reduced state in which the flexible display has the smallest size). The first screen may be an execution of application "A".

According to an embodiment, the electronic device may sense expansion (e.g., sliding-out) of the flexible display. As in drawings corresponding to reference sign 613, 615, and 617, the electronic device may scroll a list including at least one items (e.g., a thumbnail image) in response to the expansion of the flexible display. The electronic device may maintain the display of the first screen in an unexpanded region 601 of the flexible display (e.g., first regions 261-1, 263-1, and 265-1 of the first to third flexible displays 261, 263, and 265 in FIGS. 2A to 2C), and may display the list in an expanded region 602 of the flexible display (e.g., the second regions 261-2, 263-2, and 265-2 of the first to third flexible displays 261, 263, and 265 in FIGS. 2A to 2C).

When the flexible display slides in the state as in the drawing corresponding to reference sign 613, 615, or 617 and returns to the first state, the electronic device may display, as in a drawing corresponding to reference sign 614, 616, or 618, an execution screen of application "B", an execution screen of application "C", or an execution screen of application "D" on the flexible display which is in the first state.

When the expansion of the flexible display is completed in the state as in the drawing corresponding to reference sign 617, as in a drawing corresponding to reference sign 619, the electronic device may determine that there is no intention to switch a screen and may display the execution screen of application "A" on the flexible display which has been completely expanded.

FIG. 6 is similar to FIG. 5A except that the list is displayed in the expanded region 602 and not the entire region of the flexible display, and thus a detailed description thereof will be omitted. Further, the configuration in which the list is displayed in the expanded region 602 in FIG. 6 may be applied to the embodiment in FIG. 5C.

Figure 7:
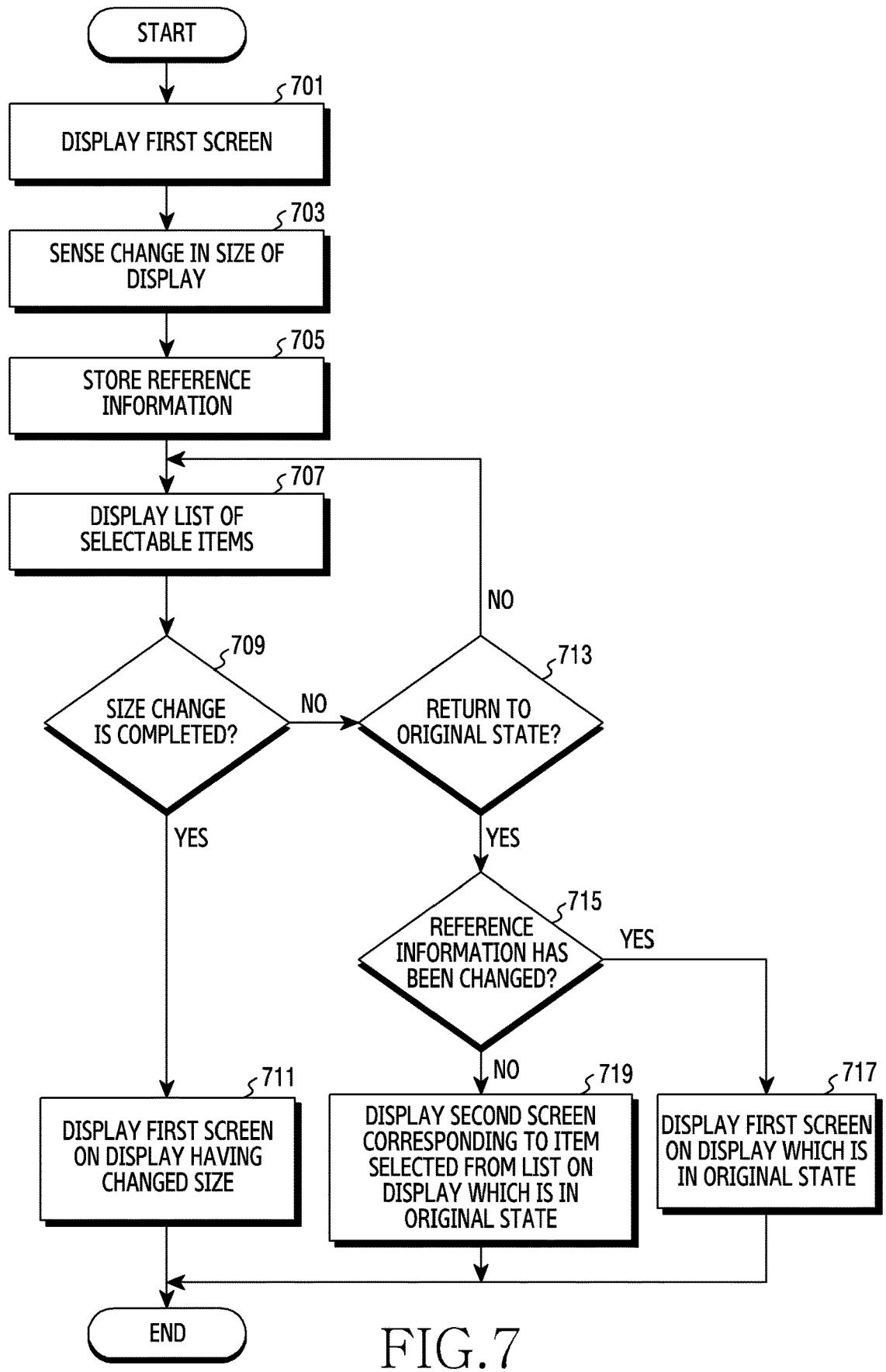
FIG. 7 illustrates a flowchart illustrating a method for controlling a screen of an electronic device according to another embodiment.

FIG. 7 illustrates a flowchart illustrating a method for controlling a screen of an electronic device according to another embodiment Referring to FIG. 7, a processor (e.g., the processor 120 in FIG. 1 or the processor 320 in FIG. 3) of an electronic device (e.g., the electronic device 101 in FIG. 1, the first to third electronic devices 201, 203, and 205 in FIGS. 2A to 2C, or the electronic device 301 in FIG. 3) according to an embodiment may display a first screen on a flexible display (e.g., the display module 160 in FIG. 1, the first to third flexible displays 261, 263, and 265 in FIGS. 2A to 2C, or the flexible display 360 in FIG. 3) in operation 701, and may sense a change in the size of the flexible display in operation 703. Operations 701 and 703 are similar to operations 401 and 403 in FIG. 4, and thus a detailed description thereof will be omitted.

According to certain embodiments, in operation 705, the processor may store reference information. The reference information may be, for example, information about a position which a user touches when expanding (sliding out) or reducing (sliding in) the flexible display.

According to certain embodiments, the processor may display a list including at least one selectable item in operation 707, and may determine in operation 709 whether the size of the flexible display has been completely changed. Operations 707 and 709 are similar to operations 405 and 407 in FIG. 4, and thus a detailed description thereof will be omitted.

As a result of the determination in operation 709, when the size change is completed, the processor may display, in operation 711, the first screen on the flexible display which has a changed size (e.g., is in an expanded state or a reduced state).

In contrast, as a result of the determination in operation 709, when the size change is not completed, the processor may determine in operation 713 whether the size of the flexible display returns to the original state (e.g., a reduced state or an expanded state). As a result of the determination in operation 713, when the size of the flexible display does not return to the original state, the processor may return to operation 707. In contrast, as a result of the determination in operation 713, when the size of the flexible display returns to the original state, the processor may determine in operation 715 whether the reference information has been changed.

As a result of the determination in operation 715, when the reference information (e.g., the information about a position which the user touches) has been changed, the processor may determine in operation 717 that there is no intention to switch a screen and may display the first screen on the flexible display which is in the original state. In contrast, as a result of the determination in operation 715, when the reference information has not been changed, the processor may display, in operation 719, a second screen corresponding to an item selected from the list on the flexible display which is in the original state. Operation 719 is similar to operation 413 in FIG. 4, and thus a detailed description thereof will be omitted.

Figure 8:
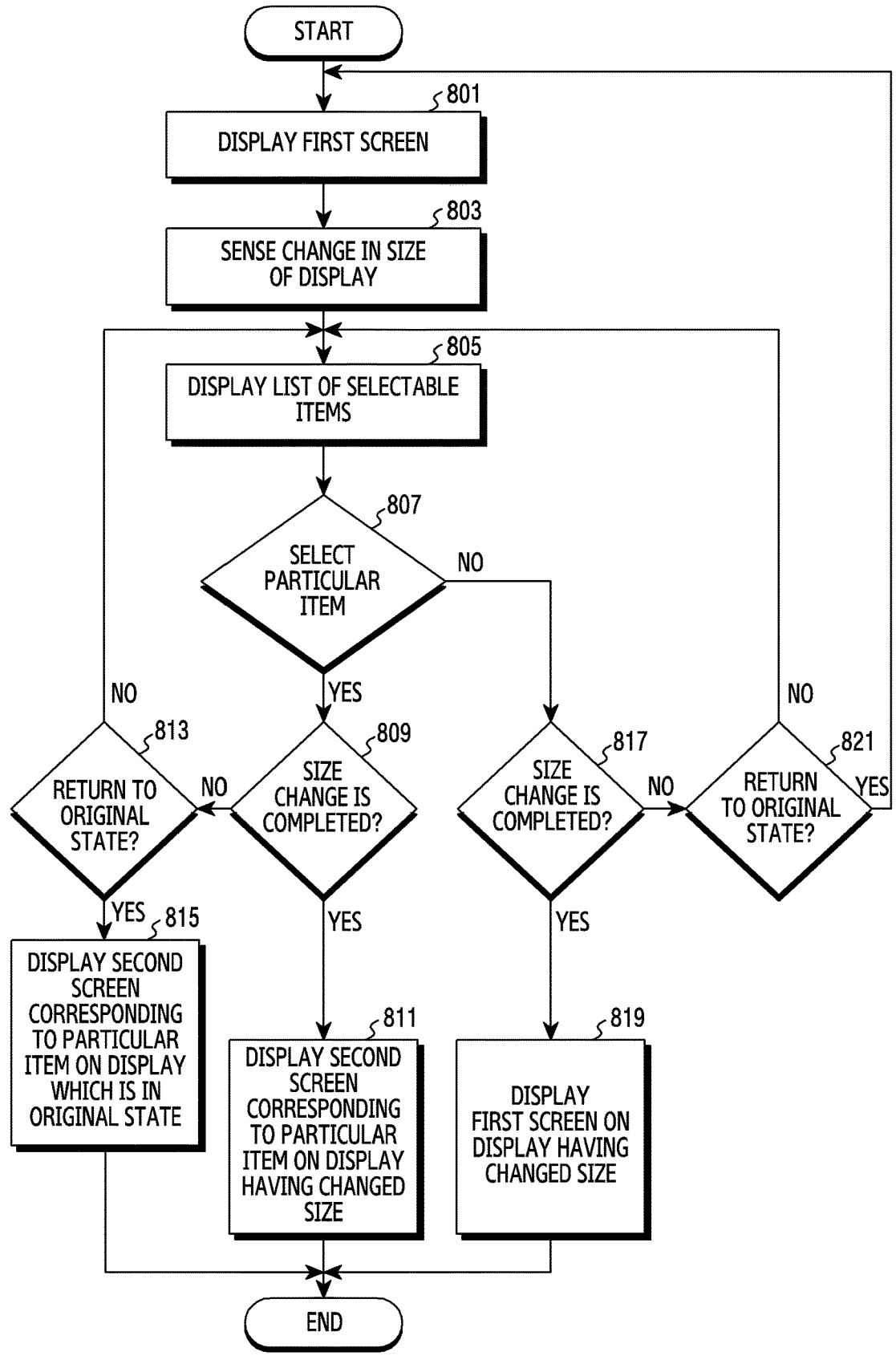
FIG. 8 illustrates a flowchart illustrating a method for controlling a screen of an electronic device according to another embodiment.

FIG. 8 illustrates a flowchart illustrating a method for controlling a screen of an electronic device according to another embodiment.

Referring to FIG. 8, operations 801, 803, and 805 according to an embodiment are similar to operations 401, 403, and 405 in FIG. 4, and thus a detailed description thereof will be omitted.

According to certain embodiments, in operation 807, a processor may determine whether a particular item is selected. For example, the processor may determine whether a touch input is sensed in the entire region or designated region of a flexible display while the size of the flexible display changes. According to an embodiment, the processor may determine whether one of items included in a list is touched.

As a result of the determination in operation 807, when a particular item is selected, the processor may determine in operation 809 whether a change in the size of the flexible display is completed. As a result of the determination in operation 809, when the size change has been completed, the processor may display a second screen corresponding to the particular item on the flexible display, which has a changed size (e.g., is in an expanded state or a reduced state), in operation 811.

In contrast, as a result of the determination in operation 809, when the size change has not been completed, the processor may determine in operation 813 whether the size of the flexible display returns to an original state. As a result of the determination in operation 813, when the size of the flexible display does not return to the original state, the processor may return to operation 805. In contrast, as a result of the determination in operation 813, when the size of the flexible display returns to the original state, the processor may display, in operation 815, the second screen corresponding to the particular item on the flexible display which is in the original state.

As a result of the determination in operation 807, when a particular item is not selected, the processor may determine in operation 817 whether a change in the size of the flexible display is completed. As a result of the determination in operation 817, when the size change is completed, the processor may display, in operation 819, the first screen on the flexible display which has a changed size (e.g., is in an expanded state or a reduced state). In contrast, as a result of the determination in operation 817, when the size change is not completed, the processor may determine in operation 821 whether the size of the flexible display returns to the original state. As a result of the determination in operation 821, when the size of the flexible display does not return to the original state, the processor may return to operation 805. In contrast, as a result of the determination in operation 821, when the size of the flexible display returns to the original state, the processor may return to operation 801 and may maintain the display of the first screen.

Figure 9A:
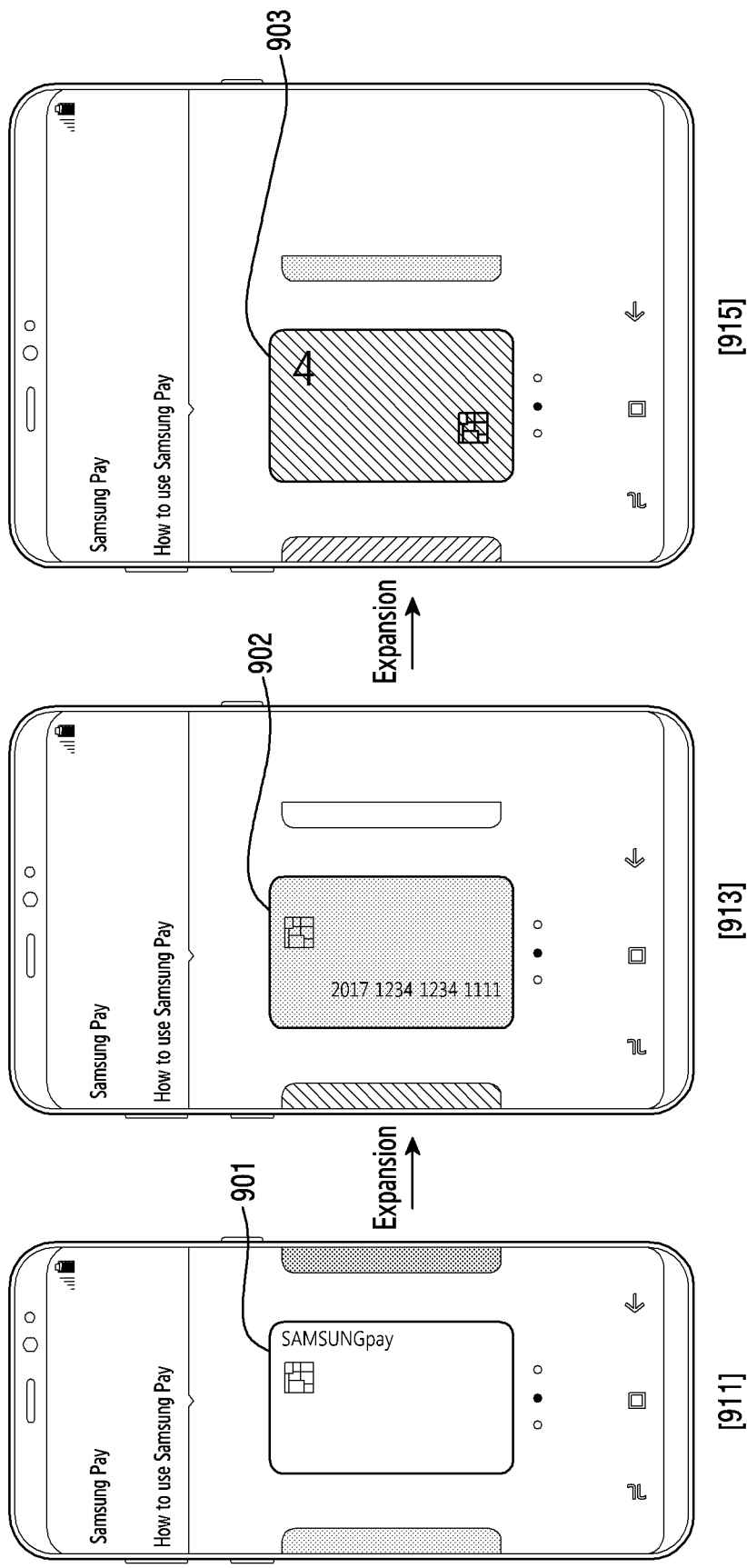
FIG. 9A illustrates an example of controlling an object included in an application according to an embodiment.

FIG. 9A illustrates an example of controlling an object included in an application according to an embodiment.

Referring to FIG. 9A, an electronic device (e.g., the electronic device 101 in FIG. 1, the first to third electronic devices 201, 203, and 205 in FIGS. 2A to 2C, or the electronic device 301 in FIG. 3) according to an embodiment may perform switching (scrolling) of an object included in an application but not switching between applications through a sliding interaction. For example, the electronic device may select, through a sliding interaction, one payment card from a list of payment cards included in a payment application and may execute the one selected payment card. For example, as illustrated in a drawing corresponding to reference sign 911 in FIG. 9A, the electronic device may display a screen of a payment application including thumbnail images 901, 902, and 903 of multiple selectable payment cards.

According to an embodiment, as illustrated in drawings corresponding to reference sign 913 and reference sign 915 in FIG. 9A, the electronic device may scroll the thumbnail images 901, 902, and 903 of the payment cards as a flexible display expands in the transverse direction. When a designated input (e.g., a touch on a first thumbnail image 901) is sensed in a state as in the drawing corresponding to reference sign 911, the electronic device may display a payment screen using a first payment card. Further, in a state in which a second thumbnail image 902 or a third thumbnail image 903 is displayed as a representative image as illustrated in the drawing corresponding to reference sign 913 or the drawing corresponding to reference sign 915, when the flexible display is reduced into the original state, the electronic device may display a payment screen using a second payment card or a third payment card. Thus, the electronic device according to an embodiment can easily perform switching between multiple cards included in a payment application through a sliding interaction.

The drawing corresponding to reference sign 913 and the drawing corresponding to reference sign 915 in FIG. 9A illustrate that the size of a payment application screen displaying a thumbnail image is maintained even when the flexible display is expanded in the transverse direction. However, the payment application screen may be enlarged in response to the expansion of the flexible display.

Figure 9B:
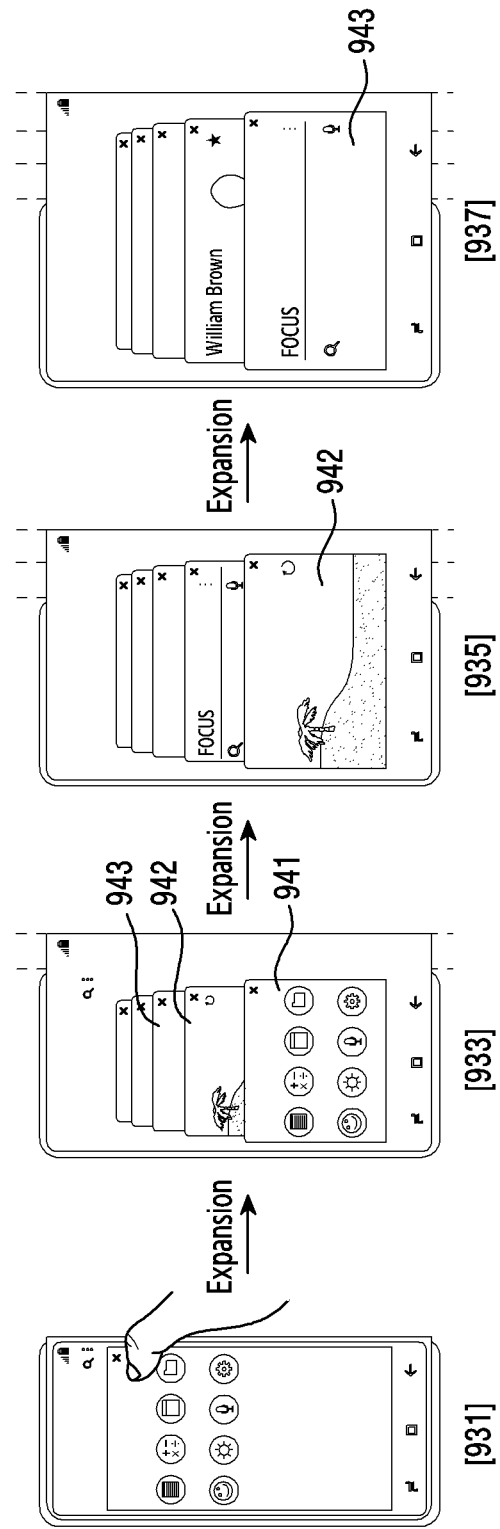
FIG. 9B illustrates another example of controlling an object included in an application according to an embodiment.

FIG. 9B illustrates another example of controlling an object included in an application according to an embodiment.

Referring to FIG. 9B, an electronic device according to an embodiment may select, through a sliding interaction, one tab from a list of multiple tabs included in a web browser application and may execute the one selected tab. For example, as illustrated in a drawing corresponding to reference sign 931 in FIG. 9B, the electronic device may display an execution screen of a web browser application. At this time, the web browser application may include multiple tabs.

According to an embodiment, when expansion of a flexible display is sensed, the electronic device may display a list screen including thumbnail images 941, 942, and 943 corresponding to the multiple tabs, as illustrated in a drawing corresponding to reference sign 933 in FIG. 9A.

According to an embodiment, as illustrated in a drawing corresponding to reference sign 935 and a drawing corresponding to reference sign 937, the electronic device may scroll the thumbnail images in response to the expansion of the flexible display.

According to an embodiment, when the flexible display is reduced into the original state in a state as in the drawing corresponding to reference sign 935 or the drawing corresponding to reference sign 937, the electronic device may display a tab screen corresponding to a second thumbnail image 942 or a third thumbnail image 943. Thus, the electronic device according to an embodiment may easily perform, through a sliding interaction, switching between multiple tabs included in a web browser application.

Figure 10:
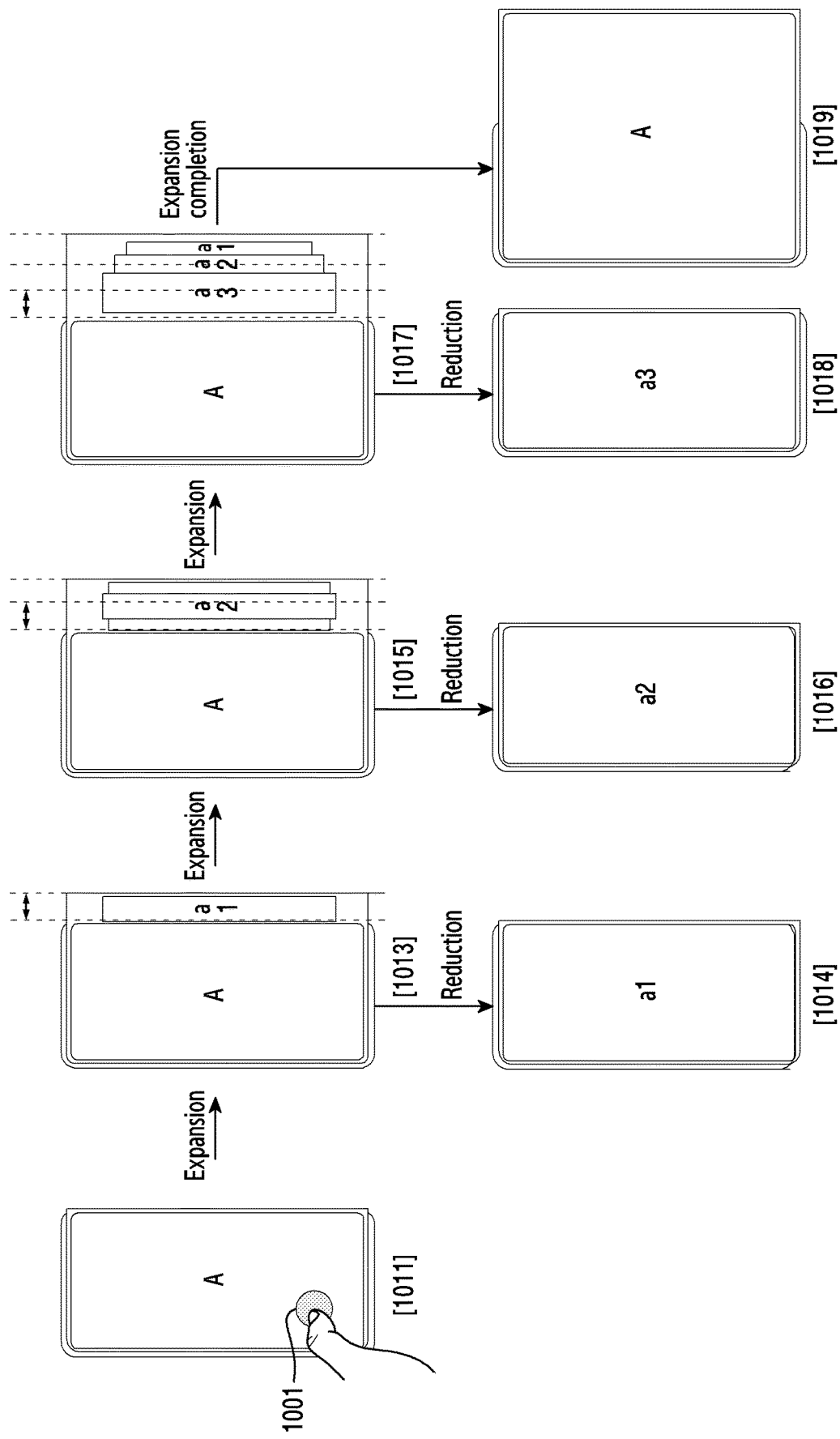
FIG. 10 illustrates a method for controlling a screen of an electronic device by using a sliding interaction according to another embodiment.

FIG. 10 illustrates a method for controlling a screen of an electronic device by using a sliding interaction according to another embodiment.

Referring to FIG. 10, an electronic device (e.g., the electronic device 101 in FIG. 1, the first to third electronic devices 201, 203, and 205 in FIGS. 2A to 2C, or the electronic device 301 in FIG. 3) according to an embodiment may display a first screen on a flexible display (e.g., the display module 160 in FIG. 1, the first to third flexible displays 261, 263, and 265 in FIGS. 2A to 2C, or the flexible display 360 in FIG. 3) which is in a first state (a reduced state in which the flexible display has the smallest size). The first screen may be an execution screen of a particular application (e.g., application "A"). According to an embodiment, a processor may determine whether the first screen includes a selectable object. As illustrated in a drawing corresponding to reference sign 1011, when the first screen includes objects a1, a2, and a3, the electronic device may display a switching icon 1001 for switching between the objects a1, a2, and a3 in one region of the first screen. When the first screen does not include any selectable object, the switching icon 1001 may not be displayed on the first screen. For example, the selectable objects a1, a2, and/or a3 may include respective credit cards in a payment application (e.g., see FIG. 9A) or respective opened tabs (or windows) in an Internet browser (e.g., see FIG. 9B).

According to an embodiment, when the switching icon 1001 is selected (e.g., touched) or when expansion (e.g., sliding-out) of the flexible display is sensed while the switching icon 1001 is selected (while touch is maintained), the electronic device may scroll a list including the objects a1, a2, and a3 in response to the expansion of the flexible display, as illustrated in drawings corresponding to reference signs 1013, 1015, and 1017. The electronic device may maintain the display of the first screen in an unexpanded region of the flexible display (e.g., the first regions 261-1, 263-1, 265-1 of the first to third flexible displays 261, 263, and 265 in FIGS. 2A to 2C), and may display the list in an expanded region of the flexible display (e.g., the second regions 261-2, 263-2, 265-2 of the first to third flexible displays 261, 263, and 265 in FIGS. 2A to 2C).

In a state as in the drawing corresponding to reference sign 1013, 1015, or 1017, when the flexible display slides in and returns to the first state, the electronic device may display a screen corresponding to a first object a1, a screen corresponding to a second object a2, or a screen corresponding to a third object a3 on the flexible display which is in the first state, as illustrated in a drawing corresponding to reference sign 1014, 1016, or 1018.

When the expansion of the flexible display is completed in the state as in the drawing corresponding to reference sign 1017, the electronic device may determine, as illustrated in a drawing corresponding to reference sign 1019, that there is no intention to switch a screen, and may display the screen of application "A" on the flexible display which has been completely expanded.

In the state as in the drawing corresponding to reference sign 1011, when expansion (e.g., sliding-out) of the flexible display is sensed without selecting the switching icon 1001, the electronic device may perform, as described in FIG. 6, switching between applications which have been recently executed or have been frequently used. Further, the switching icon 1001 in FIG. 10 may be applied to the embodiments in FIGS. 5A to 5C, the embodiment in FIG. 7, and the embodiment in FIG. 8.

Figure 11:
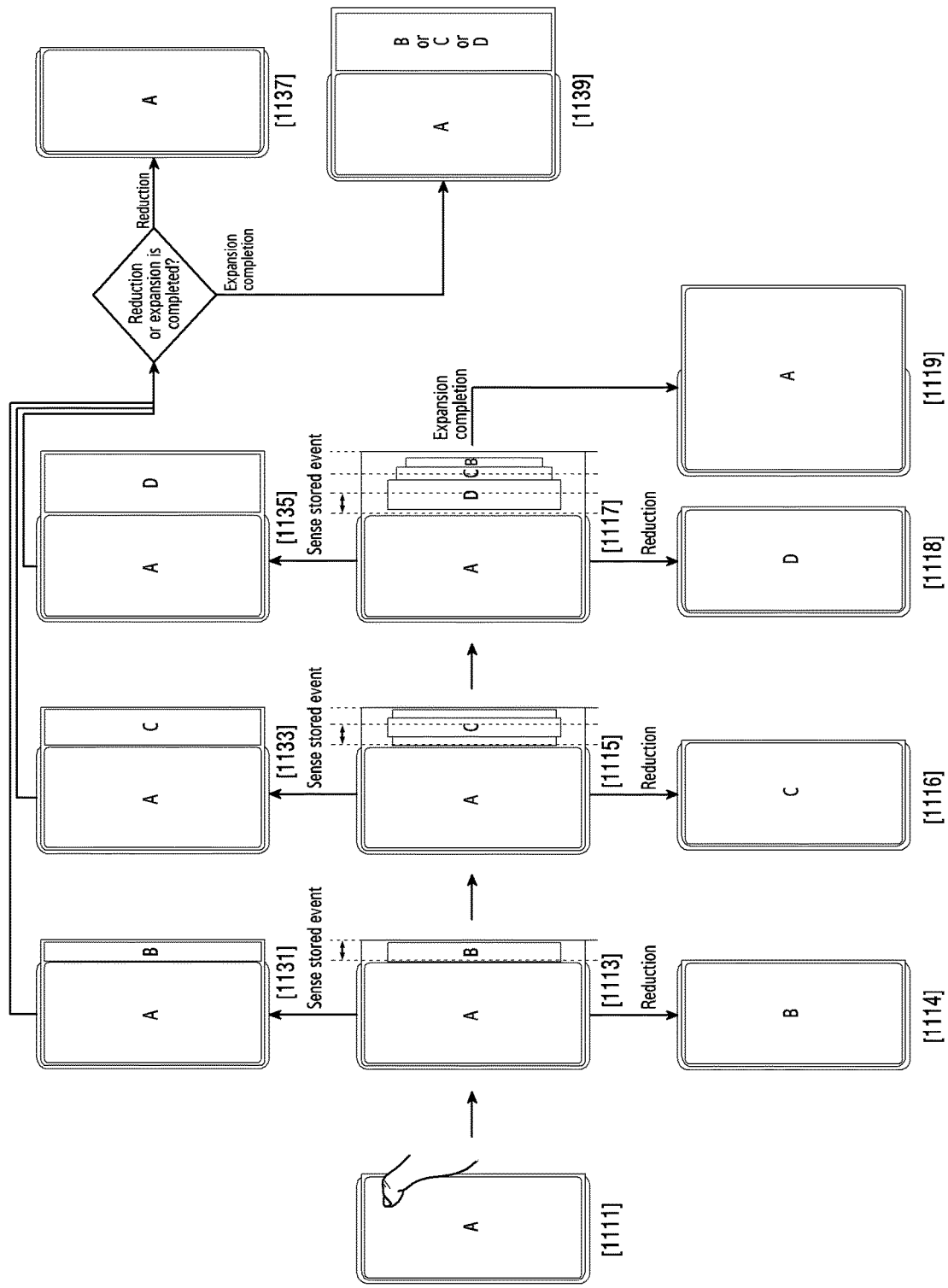
FIG. 11 illustrates a method for executing a multiscreen of an electronic device executes by using a sliding interaction according to another embodiment.

FIG. 11 illustrates a method for executing a multiscreen of an electronic device executes by using a sliding interaction according to another embodiment Referring to FIG. 11, an electronic device (e.g., the electronic device 101 in FIG. 1, the first to third electronic devices 201, 203, and 205 in FIGS. 2A to 2C, or the electronic device 301 in FIG. 3) according to an embodiment may display, as illustrated in a drawing corresponding to reference sign 1111, a first screen on a flexible display (e.g., the display module 160 in FIG. 1, the first to third flexible displays 261, 263, and 265 in FIGS. 2A to 2C, or the flexible display 360 in FIG. 3) which is in a first state (a reduced state in which the flexible display has the smallest size). The first screen may be an execution screen of a particular application (e.g., application "A").

According to an embodiment, when expansion (e.g., sliding-out) of the flexible display is sensed, the electronic device may display, as illustrated in drawings corresponding to reference sign 1113, 1115, and 1117, a list including at least one item, and may scroll the list in response to the expansion of the flexible display. The electronic device may maintain the display of the first screen in an unexpanded region of the flexible display (e.g., the first regions 261-1, 263-1, and 265-1 of the first to third flexible displays 261, 263, and 265 in FIGS. 2A to 2C), and may display the list in an expanded region of the flexible display (e.g., the second regions 261-2, 263-2, and 265-2 of the first to third flexible displays 261, 263, and 265 in FIGS. 2A to 2C).

In a state as in the drawing corresponding to reference sign 1113, 1115, or 1117, when the flexible display slides in and returns to the first state, the electronic device may display, as illustrated in a drawing corresponding to reference sign 1114, 1116, or 1118, an execution screen of application "B", an execution screen of application "C", or an execution screen of application "D" on the flexible display which is in the first state. In a state as in the drawing corresponding to reference sign 1117, when the expansion of the flexible display is completed, the electronic device may determine, as illustrated in a drawing corresponding to reference sign 1119, that there is no intention to switch a screen and may expand and display the screen of application "A" such that the screen corresponds to the flexible display which has been completely expanded.

In the state as in the drawing corresponding to reference sign 1113, 1115, or 1117, when a designated event (e.g., holding (or free stop) without sliding-in or sliding out for a designated time (e.g., 1 second), long touch, pressure touch, gesture input, and/or touch on an icon for multiscreen execution) is sensed, the electronic device may display, as illustrated in a drawing corresponding to reference sign 1131, 1133, or 1135, the first screen and an application execution screen corresponding to a representative image through a multiscreen. For example, the electronic device may display the first screen (the execution screen of application A) in a first region, and may display a second screen (the execution screen of application B, the execution screen of application C, or the execution screen of application D) in a second region.

According to an embodiment, in a state as in the drawing corresponding to reference sign 1131, 1133, or 1135, when the flexible display returns to the original state, the electronic device may display, as illustrated in a drawing corresponding to reference sign 1137, the first screen on the flexible display which is in the original state. In contrast, in the state as in the drawing corresponding to reference sign 1131, 1133, or 1135, when a change of the size of the flexible display is completed (when the flexible display has been completely expanded), the electronic device may expand and display, as illustrated in a drawing corresponding to reference sign 1139, the multiscreen corresponding to the flexible display of which the size change has been completed.

According to an embodiment, in a state as in the drawing corresponding to reference sign 1139, when the size of the flexible display is reduced to that in the state of reference sign 1111, a processor may end the multiscreen, and may not display, in the first region, the second screen (the execution screen of application B, the execution screen of application C, or the execution screen of application D) which was displayed in the second region.

According to an embodiment, in a state as in the drawing corresponding to reference sign 1139, when the size of the flexible display is reduced to that in the state of reference sign 1111, the processor may screen-split the first region, and may reduce the first screen and the second screen (the execution screen of application B, the execution screen of application C, or the execution screen of application D) displayed in the second region and display the reduced first and second screens in the first region which has been screen-split.

The drawings corresponding to reference sign 1131, 1133, 1135, and 1139 in FIG. 11 illustrate that the first screen and the second screen have unequal sizes. However, according to an embodiment, the electronic device may adjust and display the first screen and the second screen in an equal size when executing a multiscreen. Further, the embodiment in FIG. 11, in which a multiscreen is executed using a sliding interaction, may be combined with at least one among the above-described other embodiments.

Hereinbefore, certain embodiments have been described while taking a slidable electronic device as an example. However, certain embodiments may be applied to a rollable electronic device. For example, when unrolling of a flexible display in a rolled state is sensed, the rollable electronic device may display a list screen including at least one item while the flexible display is unrolled, and when the unrolling of the flexible display is completed, the rollable electronic device may display a screen corresponding to an item selected while the flexible display is unrolled. Alternatively, when rolling of the flexible display in an unrolled state is sensed, the rollable electronic device may display a list screen while the flexible display is rolled, and, when the flexible display is unrolled again without being completely rolled, the rollable electronic device may display, on the unrolled display, a screen corresponding to an item selected while the flexible display is rolled.

According to certain embodiments, an electronic device comprises: a flexible display; at least one sensor configured to sense changes in a size of a viewable portion of the flexible display; at least one processor operatively connected to the flexible display and the at least one sensor; and a memory operatively connected to the at least one processor, wherein the memory stores instructions that, when being executed, cause the at least one processor to perform a plurality of operations comprising: displaying a first screen on the flexible display; sensing a change in the size of the viewable portion of the flexible display through the at least one sensor; displaying a list comprising at least one selectable item in at least a partial region of the flexible display during the changing of the size of the viewable portion of the flexible display; detecting that the changing of the size of the viewable portion of the flexible display has stopped; in response to detecting the size of the viewable portion of the flexible display has stopped, displaying the first screen corresponding to the viewable portion of the flexible display with the changed size; and in response to returning of the size of the viewable portion of the flexible display to an original size without completing the change in the size of the viewable portion of the flexible display, displaying a second screen corresponding to a selectable item while the size of the viewable portion of the flexible display changes, among items included in the list, on the viewable portion of the flexible display having the original size.

According to certain embodiments, displaying the second screen corresponding to the selected item on the flexible display having the original size comprises determining the selected item, based on a time point at which a direction of the change in the size of the flexible display changes while the size of the flexible display changes.

According to certain embodiments, the at least one selectable item comprises at least one object included in a screen of at least one previously executed application or a screen of a currently executed application.

According to certain embodiments, the list comprises a number of items, wherein the number is based on a priority.

According to certain embodiments, the list comprises an item displayed as a representative item, and in response to the change in the size of the viewable portion of the flexible display the representative item is changed.

According to certain embodiments, displaying the second screen corresponding to the selected item on the flexible display having the original size comprises: determining that the representative item is the selected item; or determining that an item, selected by a user among the items included in the list, is the selected item.

According to certain embodiments, the plurality of operations further comprises: storing reference information in response to sensing of the change in the size of the viewable portion of the flexible display; when the flexible display returns to the original size, determining whether the reference information has been changed; displaying the second screen on the flexible display having the original size when the reference information has not been changed; and displaying the first screen on the flexible display having the original size when the reference information has been changed.

According to certain embodiments, the plurality of operations further comprises: determining whether the first screen comprises at least one selectable object; and displaying a designated icon in one region of the first screen when the first screen comprises at least one selectable object, and wherein displaying the list comprising the at least one selectable item further comprises: displaying at least one selectable object included in the first screen as the list when the change in the size of the viewable portion of the flexible display is sensed in a state in which the designated icon is selected; and displaying the at least one previously executed application as the list when the change in the size of the viewable portion of the flexible display is sensed in a state in which the designated icon is not selected.

According to certain embodiments, the plurality of operations further comprises: sensing the change in the size of the viewable portion of the flexible display; and displaying the first screen and the second screen by using a multiscreen when a designated event is sensed before the change in the size of the viewable portion of the flexible display is completed.

According to certain embodiments, displaying the first screen and the second screen by using the multiscreen further comprises: maintaining the display of the first screen and displaying the second screen in an expanded region of the flexible display; or equally splitting the flexible display having a changed size and displaying the first screen and the second screen on the split flexible display.

According to certain embodiments, a method for controlling a screen of an electronic device capable of expanding a display region comprises: displaying a first screen on a display; sensing a change in a size of a viewable portion of the display through at least one sensor; displaying a list comprising at least one selectable item in at least a partial region of the display during the changing of the size of the viewable portion of the display; detecting the changing of the size of the viewable portion of the display has stopped; in response to detecting the size of the viewable portion of the display has stopped, displaying the first screen corresponding to the display having the changed size; and in response to returning of the size of the viewable portion of the display to an original size without completing the change in the size of the viewable portion of the display, displaying a second screen corresponding to a selectable item while the size of the viewable portion of the display changes, among items included in the list, on the display having the original size.

According to certain embodiments, displaying of the second screen corresponding to the selected item on the display having the original size comprises determining the selected item, based on a time point at which a direction of the change in the size of the display changes while the size of the display changes.

According to certain embodiments, the at least one selectable item comprises at least one object included in a screen of at least one previously executed application or a screen of a currently executed application.

According to certain embodiments, the list comprises a number of items, wherein the number is based on a priority.

According to certain embodiments, the list comprises an item displayed as a representative item, and in response to the change in the size of the viewable portion of the display the representative item is changed.

According to certain embodiments, the displaying of the second screen corresponding to the selected item on the display having the original size comprises: determining that the representative item is the selected item; or determining that an item, selected by a user among the items included in the list, is the selected item.

According to certain embodiments, the method further comprises storing reference information in response to sensing of the change in the size of the viewable portion of the display; when the display returns to the original size, determining whether the reference information has been changed; displaying the second screen on the display having the original size when the reference information has not been changed; and displaying the first screen on the display having the original size when the reference information has been changed.

According to certain embodiments, the method further comprises determining whether the first screen comprises at least one selectable object; and displaying a designated icon in one region of the first screen when the first screen comprises at least one selectable object, wherein displaying the list comprising the at least one selectable item comprises: displaying at least one selectable object included in the first screen as the list when the change in the size of the viewable portion of the display is sensed in a state in which the designated icon is selected; and displaying the at least one previously executed application as the list when the change in the size of the viewable portion of the display is sensed in a state in which the designated icon is not selected.

According to certain embodiments, the method further comprises sensing the change in the size of the viewable portion of the display and displaying the first screen and the second screen by using a multiscreen when a designated event is sensed before the change in the size of the viewable portion of the display is completed.

According to certain embodiments, the displaying of the first screen and the second screen by using the multiscreen comprises: maintaining the display of the first screen and displaying the second screen in an expanded region of the display; or equally splitting the display having a changed size and displaying the first screen and the second screen on the split display.

The electronic device according to certain embodiments can easily control a screen (switch a screen or execute a multiscreen) through an operation of expanding or reducing (e.g., sliding out or sliding in) a display region, and thus can improve the user convenience. Further, certain embodiments can provide screen control (e.g., a user interaction) optimized for an electronic device (e.g., a slidable electronic device) in which a display region is capable of being expanded, thereby increasing user satisfaction with the electronic device.

What is claimed is:

1. An electronic device comprising:
a flexible display; and
at least one processor operatively connected to the flexible display,
wherein the at least one processor is configured to:
display a first execution screen of a first application on a first region of the flexible display,
while a viewable portion of the flexible display is being expanded, sequentially display a plurality of items on a second region of the flexible display, the plurality of items corresponding to a plurality of applications respectively, and
in response to a designated event being identified while an item of the plurality of items is displayed on the second region, display a second execution screen corresponding to the item on the second region of the flexible display while the first execution screen is being displayed on the first region of the flexible display,
wherein the item is automatically selected based on an amount that the flexible display is expanded.

2. The electronic device of claim 1, wherein the at least one processor is further configured to, in response to a size of the second region being changed, display the second execution screen on the changed second region of the flexible display.

3. The electronic device of claim 1, wherein the flexible display is configured to support a multi-window, and wherein the first region and the second region correspond to a first window and a second window respectively.

4. The electronic device of claim 1, wherein the plurality of items corresponds to thumbnail images of the plurality of applications respectively.

5. The electronic device of claim 1, wherein a size of the second region increases based on expansion of the viewable portion of the flexible display.

6. The electronic device of claim 1, wherein the at least one processor is further configured to select a first one of at least one second application when a size of the second region is a first size and replace selection of the first one of the at least one second application with a second one of the at least one second application when the size of the second region is a second size.

7. The electronic device of claim 6, wherein the at least one processor is further configured to: control at least one sensor to identify whether a size of the second region is changed, and in response to identifying that the size of the second region is maintained for a first time period, determine the designated event is sensed.

8. The electronic device of claim 6, wherein the at least one processor is further configured to: identify whether a touch input is received through the flexible display, and in response to receiving a touch input lasting for a second time period on a portion of the flexible display, determine the designated event is sensed.

9. The electronic device of claim 6, wherein the at least one processor is further configured to: display a designated icon on the flexible display, identify whether a touch input is received through the flexible display, and in response to receiving a touch input for the designated icon, determine the designated event is sensed.

10. The electronic device of claim 1, wherein the designated event comprises holding a size of the second region for a predetermined amount of time and wherein the second execution screen is displayed in response to identification that the size of the second region has been held for the predetermined amount of time.

11. An operating method of an electronic device comprising a flexible display and at least one sensor, the operating method comprising:
   displaying a first execution screen of a first application on a first region of the flexible display,
   while a viewable portion of the flexible display is being expanded, sequentially displaying a plurality of items on a second region of the flexible display, the plurality of items corresponding to a plurality of applications respectively, and
   in response to a designated event being identified while an item of the plurality of items is displayed on the second region, displaying a second execution screen corresponding to the item on the second region of the flexible display while the first execution screen is being displayed on the first region of the flexible display,
   wherein the item is automatically selected based on an amount that the flexible display is expanded.

12. The operating method of claim 11, further comprising, in response to a size of the second region being changed, displaying the second execution screen on the changed second region of the flexible display.

13. The operating method of claim 11, wherein the flexible display is configured to support a multi-window, and wherein the first region and the second region correspond to a first window and a second window respectively.

14. The operating method of claim 11, wherein the plurality of items corresponds to thumbnail images of the plurality of applications respectively.

15. The operating method of claim 11, wherein a size of the second region increases based on expansion of the viewable portion of the flexible display.

16. The operating method of claim 11, further comprising, selecting at a first one of at least one second application when a size of the second region is a first size and replace selection of the first one of the at least one second application with a second one of the at least one second application when the size of the second region is a second size.

17. The operating method of claim 11, further comprising: controlling the at least one sensor to identify whether a size of the second region is changed, and in response to identifying that the size of the second region is maintained for a first time period, determining the designated event is sensed.

18. The operating method of claim 11, further comprising: identifying whether a touch input is received through the flexible display, and in response to receiving a touch input lasting for a second time period on a portion of the flexible display, determining the designated event is sensed.

19. The operating method of claim 11, further comprising: displaying a designated icon on the flexible display, identifying whether a touch input is received through the flexible display, and in response to receiving a touch input for the designated icon, determining the designated event is sensed.

* * * * *